(12) United States Patent
Owada et al.

(10) Patent No.: US 10,351,114 B2
(45) Date of Patent: Jul. 16, 2019

(54) MASTER CYLINDER

(71) Applicant: Hitachi Automotive Systems, Ltd., Hitachinaka-shi, Ibaraki (JP)

(72) Inventors: Hiroshi Owada, Minami arupusu (JP); Shinya Kasai, Minami arupusu (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 366 days.

(21) Appl. No.: 14/914,878

(22) PCT Filed: Aug. 4, 2014

(86) PCT No.: PCT/JP2014/070454
§ 371 (c)(1),
(2) Date: Feb. 26, 2016

(87) PCT Pub. No.: WO2015/029701
PCT Pub. Date: Mar. 5, 2015

(65) Prior Publication Data
US 2016/0200304 A1    Jul. 14, 2016

(30) Foreign Application Priority Data

Aug. 30, 2013 (JP) .................................. 2013-180547

(51) Int. Cl.
*B60T 11/236* (2006.01)
*F16J 9/08* (2006.01)
(Continued)

(52) U.S. Cl.
CPC .............. *B60T 11/236* (2013.01); *F16J 9/08* (2013.01); *F16J 15/164* (2013.01); *F16J 15/3236* (2013.01)

(58) Field of Classification Search
CPC ... B60T 11/236; F16J 9/08; F16J 15/18; F16J 15/32; F16J 15/164
(Continued)

(56) References Cited

U.S. PATENT DOCUMENTS 4,781,024 A * 11/1988 Nakamura ............ B60T 11/236
                                              277/558
7,401,468 B2 * 7/2008 Mouri ..................... B60T 11/20
                                              277/441
(Continued)

FOREIGN PATENT DOCUMENTS

| JP | 2006-123879 | 5/2006 |
| JP | 2008-111495 | 5/2008 |
| WO | WO 2009/022476 | 2/2009 |

OTHER PUBLICATIONS

International Search Report and Written Opinion for PCT/JP2014/070454, dated Oct. 7, 2014, 10 pages.

*Primary Examiner* — Thomas E Lazo
*Assistant Examiner* — Richard Drake
(74) *Attorney, Agent, or Firm* — Mattingly & Malur, PC

(57) ABSTRACT

In a master cylinder, a piston seal provided in a circumferential groove includes an annular base section, an inner circumferential lip section protruding from an inner circumferential side of the base section to come into sliding contact with an outer circumferential surfaced of a piston, an outer circumferential lip section protruding from an outer circumferential side of the base section to abut the circumferential groove, and an intermediate protrusion section protruding from a portion between the inner circumferential lip section and the outer circumferential lip section of the base section to a position further forward than the outer circumferential lip section. At least one inner circumferential side groove extending in an axial direction and opened at a front end side of the intermediate protrusion section is formed in a surface (Continued)

of the inner circumferential lip section side of the intermediate protrusion section.

8 Claims, 13 Drawing Sheets

(51) Int. Cl.
 *F16J 15/16* (2006.01)
 *F16J 15/3236* (2016.01)
(58) Field of Classification Search
 USPC .......... 60/585–589, 533; 277/549; 303/114.1
 See application file for complete search history.

(56) References Cited

U.S. PATENT DOCUMENTS

| | | | | |
|---|---|---|---|---|
| 7,520,132 B2* | 4/2009 | Chiba | ................... | B60T 11/236 60/588 |
| 7,937,940 B2* | 5/2011 | Gaffe | ................... | B60T 11/236 60/588 |
| 8,109,088 B2* | 2/2012 | Grech | ................... | B60T 11/236 277/439 |
| 8,276,994 B2* | 10/2012 | Lee | ................... | F16J 15/56 188/358 |
| 8,578,710 B2* | 11/2013 | Aoki | ................... | F16J 15/3236 277/436 |
| 8,590,304 B2* | 11/2013 | Bernadat | ................ | B60T 11/236 60/586 |
| 2006/0064978 A1* | 3/2006 | Mouri | ................... | B60T 11/20 60/562 |
| 2006/0219507 A1* | 10/2006 | Drott | ................... | B60T 11/236 188/322.17 |
| 2010/0066028 A1* | 3/2010 | Aoki | ................... | B60T 11/232 277/353 |
| 2011/0185890 A1* | 8/2011 | Kang | ................... | B60T 11/236 92/165 R |
| 2011/0209472 A1* | 9/2011 | Aoki | ................... | B60T 11/236 60/585 |
| 2012/0110994 A1* | 5/2012 | Chen | ................... | B60T 11/232 60/533 |
| 2015/0298673 A1* | 10/2015 | Lhuillier | ............... | B60T 11/232 60/533 |

* cited by examiner

MASTER CYLINDER

TECHNICAL FIELD

The present invention relates to a master cylinder configured to supply liquid pressure into a braking cylinder of a vehicle.

This application is the U.S. national phase of International Application No. PCT/JP2014/070454 filed 4 Aug. 2014, which designated the U.S. and claims priority to Japanese Patent Application No. 2013-180547, filed Aug. 30, 2013, the entire contents of each of which are incorporated herein by reference.

BACKGROUND ART

In a master cylinder, a configuration in which a piston seal formed in an E-shaped cross section and having an inner circumferential lip section, an outer circumferential lip section and an intermediate protrusion section is disposed in a circumferential groove of a cylinder main body is known (for example, see Patent Literature 1).

CITATION LIST

Patent Literature

[Patent Literature 1] Japanese Unexamined Patent Application, First Publication No. 2006-123879

SUMMARY OF INVENTION

Technical Problem

In the above-mentioned master cylinder, when pressure in the master cylinder is higher than that upon contact in a state in which the piston seal is deformed and the intermediate protrusion section comes in contact with the inner circumferential lip section, pressure in a space between the intermediate protrusion section and the inner circumferential lip section is lower than that of a periphery thereof. In this case, it may be difficult for the intermediate protrusion section to separate from the inner circumferential lip section and the orientation of the piston seal may become unstable.

The present invention provides a master cylinder capable of stabilizing the orientation of a piston seal.

Solution to Problem

According to a first aspect of the present invention, in a master cylinder, a piston seal includes an annular base section; an inner circumferential lip section protruding from an inner circumferential side of the base section to come into sliding contact with an outer circumferential surface of a piston; an outer circumferential lip section protruding from an outer circumferential side of the base section to abut a circumferential groove of a cylinder main body; and an intermediate protrusion section protruding from a portion between the inner circumferential lip section and the outer circumferential lip section of the base section to a position further forward than the outer circumferential lip section, wherein at least one inner circumferential side groove extending in an axial direction and opened at a front end side of the intermediate protrusion section is formed in a surface of the inner circumferential lip section side of the intermediate protrusion section.

According to a second aspect of the present invention, in the master cylinder of the above-mentioned first aspect, the plurality of inner circumferential side grooves are formed in the surface of the inner circumferential lip section side of the intermediate protrusion section in a circumferential direction.

According to a third aspect of the present invention, in the master cylinder of the above-mentioned first aspect or second aspect, at least one outer circumferential side groove extending in the axial direction and opened at the front end side of the intermediate protrusion section is formed in a surface of the outer circumferential lip section side of the intermediate protrusion section.

According to a fourth aspect of the present invention, in the master cylinder of the above-mentioned third aspect, the plurality of outer circumferential side grooves are formed in a surface of the outer circumferential lip section side of the intermediate protrusion section in the circumferential direction.

According to a fifth aspect of the present invention, in the master cylinder of the above-mentioned fourth aspect, the plurality of inner circumferential side grooves and the plurality of outer circumferential side grooves are disposed to coincide with each other in the circumferential direction.

According to a sixth aspect of the present invention, in the master cylinder of the above-mentioned fourth aspect, the plurality of inner circumferential side grooves and the plurality of outer circumferential side grooves are disposed to be deviated in the circumferential direction.

According to a seventh aspect of the present invention, in the master cylinder of the above-mentioned fourth aspect, protrusion sections extending to the front end side of the intermediate protrusion section and protruding inward are formed amid the plurality of inner circumferential side grooves, and the protrusion sections are disposed to coincide with the plurality of outer circumferential side grooves in the circumferential direction.

Advantageous Effects of Invention

According to the above-mentioned master cylinder, the orientation of the piston seal can be stabilized.

DESCRIPTION OF EMBODIMENT

Figure 1:
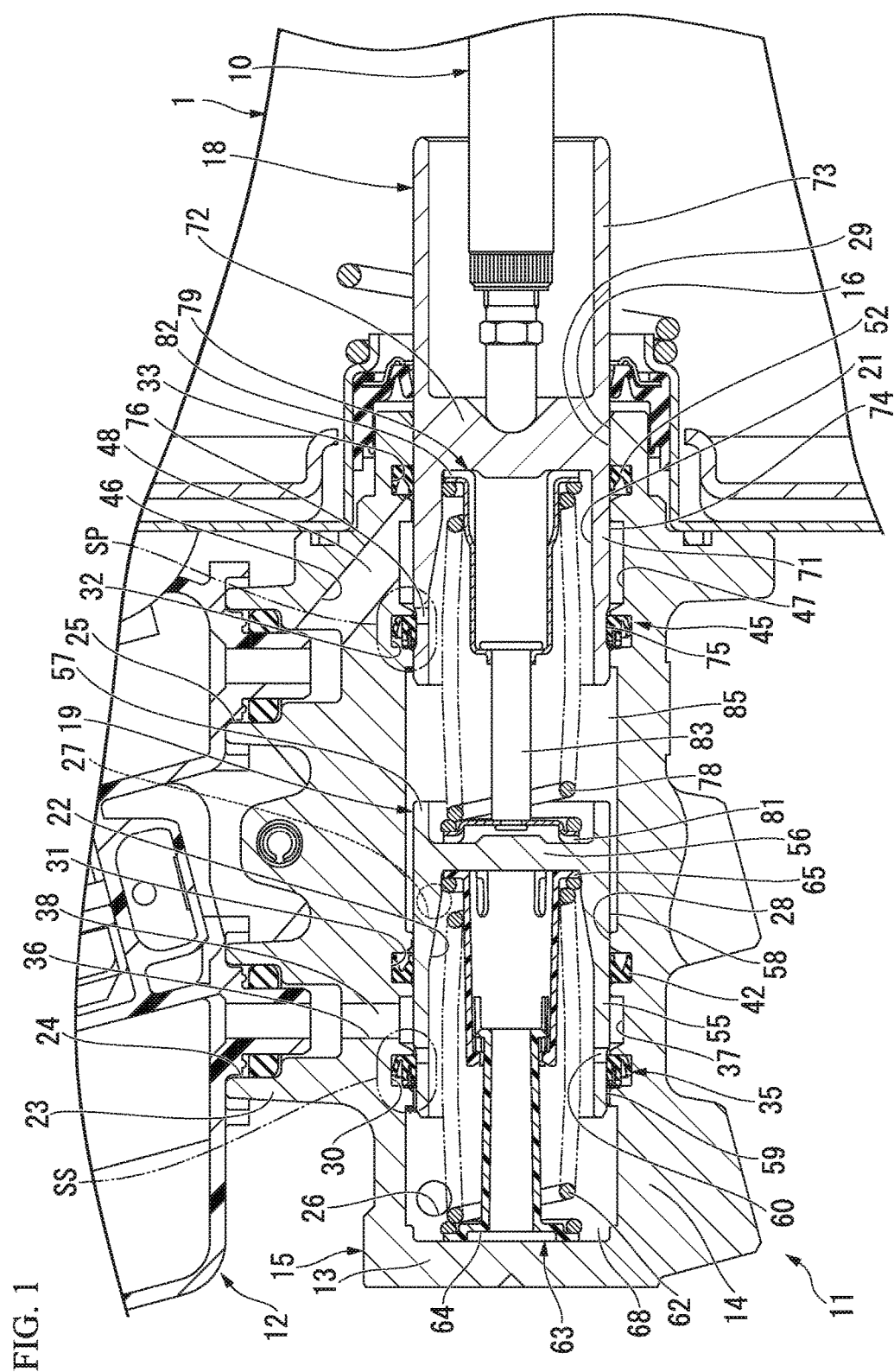
FIG. 1 is a cross-sectional view showing a master cylinder of an embodiment according to the present invention.

An embodiment according to the present invention will be described based on the accompanying drawings. A master cylinder 11 of the embodiment shown in FIG. 1 introduces force according to a manipulation amount of a brake pedal (not shown) via an output shaft 10 of a brake booster 1 (only a portion thereof is shown in FIG. 1), and generates brake liquid pressure according to the manipulation amount of the brake pedal. A reservoir 12 (only a portion thereof is shown in FIG. 1) configured to supply and discharge brake liquid to/from an upper side in a vertical direction is attached to the master cylinder 11. Further, in the embodiment, while the reservoir 12 is directly attached to the master cylinder 11, the reservoir may be disposed at a position separated from the master cylinder 11 and the reservoir and the master cylinder 11 may be connected by a pipeline.

The master cylinder 11 has a metal cylinder main body 15 formed of one material in a bottomed cylindrical shape having a bottom section 13 and a tubular section 14. The cylinder main body 15 is disposed in a vehicle in an orientation in which an axial direction is in a forward and rearward direction of the vehicle. A primary piston (a piston) 18 formed of a metal is movably disposed at an opening section 16 side of the cylinder main body 15. In addition, a secondary piston (a piston) 19 formed of the same metal is movably disposed closer to the bottom section 13 side than the primary piston 18 of the cylinder main body 15. An inner circumferential hole 21 having a bottom surface is formed in the primary piston 18. An inner circumferential hole 22 having a bottom surface is formed in the secondary piston 19. The master cylinder 11 is formed in a so-called plunger type. In addition, the master cylinder 11 is a tandem type master cylinder having the above-mentioned two pistons, i.e., the primary piston 18 and the secondary piston 19. Further, the embodiment is not limited to application to the tandem type master cylinder but may be applied to any plunger type master cylinder such as a single type master cylinder in which one piston is disposed in the cylinder main body, a master cylinder having three or more pistons, or the like, as long as the master cylinder is the plunger type master cylinder.

An attachment base section 23 protruding outward in a radial direction (hereinafter referred to as a cylinder radial direction) of the tubular section 14 is integrally formed with the cylinder main body 15 at a predetermined position in a circumferential direction (hereinafter referred to as a cylinder circumferential direction) of the tubular section 14. An attachment hole 24 and an attachment hole 25 configured to attach the reservoir 12 are formed in the attachment base section 23. Further, in the embodiment, the attachment hole 24 and the attachment hole 25 are formed at an upper side in a vertical direction at positions deviated in a direction of an axis (hereinafter referred to as a cylinder axis) of the tubular section 14 of the cylinder main body 15 in a state in which the positions in the cylinder circumferential direction coincide with each other.

A secondary discharge path (a discharge path) 26 adjacent to the bottom section 13 is formed at the attachment base section 23 side of the tubular section 14 of the cylinder main body 15. In addition, a primary discharge path (a discharge path) 27 is formed closer to the opening section 16 side of the cylinder main body 15 than the secondary discharge path 26. While not shown, the secondary discharge path 26 and the primary discharge path 27 come in communication with a braking cylinder such as a disk brake, a drum brake, or the like, via a brake pipeline, and eject brake liquid toward the braking cylinder. Further, in the embodiment, the secondary discharge path 26 and the primary discharge path 27 are formed at positions deviated in the cylinder axial direction in a state in which positions in the cylinder circumferential direction coincide with each other.

The secondary piston 19 is slidably fitted into a sliding inner diameter section 28 formed in an inner circumferential section of the bottom section 13 side of the tubular section 14 of the cylinder main body 15 and guided along the sliding inner diameter section 28 to move in the cylinder axial direction. The primary piston 18 is slidably fitted into a sliding inner diameter section 29 formed in an inner circumferential section of the opening section 16 side of the tubular section 14 of the cylinder main body 15 and guided along the sliding inner diameter section 29 to move in the cylinder axial direction.

A circumferential groove 30 and a circumferential groove 31, both of which have an annular shape, are formed in the sliding inner diameter section 28 at a plurality of, specifically two, positions deviated in the cylinder axial direction in this order from the bottom section 13 side. In addition, a circumferential groove 32 and a circumferential groove 33, both of which have an annular shape, are also formed in the sliding inner diameter section 29 at a plurality of, specifically two, positions deviated in the cylinder axial direction in this order from the bottom section 13 side.

All of the circumferential grooves 30 to 33 are formed by cutting to have an annular shape in the cylinder circumferential direction and a shape recessed outward in the cylinder radial direction.

The circumferential groove 30 closest to the bottom section 13 side among the circumferential grooves 30 to 33 is formed in the vicinity of the attachment hole 24 close to the bottom section 13 of the attachment hole 24 and the attachment hole 25. An annular piston seal 35 is disposed in the circumferential groove 30 to be held in the circumferential groove 30.

An annular opening groove 37 recessed outward in the cylinder radial direction is formed closer to the opening section 16 side than the circumferential groove 30 of the sliding inner diameter section 28 of the cylinder main body 15 such that a communication hole 36 punched from the attachment hole 24 of the bottom section 13 side is opened in the tubular section 14. Here, the opening groove 37 and the communication hole 36 constitute a secondary supply path (a supply path) 38 in constant communication with the reservoir 12 formed in the cylinder main body 15.

A communication groove (not shown) opened in the circumferential groove 30 and extending from the circumferential groove 30 toward the bottom section 13 in a linear shape in the cylinder axial direction is formed closer to the bottom section 13 side than the circumferential groove 30 of the sliding inner diameter section 28 of the cylinder main body 15 to be recessed outward in the cylinder radial direction. The communication groove brings the secondary discharge path 26 and the circumferential groove 30 disposed between the bottom section 13 and the circumferential groove 30 and formed at a position in the vicinity of the bottom section 13 in communication with each other via a secondary pressure chamber 68 (to be described below).

The circumferential groove 31 is formed in the sliding inner diameter section 28 of the cylinder main body 15 at a side of the opening groove 37 opposite to the circumferential groove 30 in the cylinder axial direction, i.e., the opening section 16 side of the cylinder main body 15. An annular compartment seal 42 is disposed in the circumferential groove 31 to be held in the circumferential groove 31.

The circumferential groove 32 is formed in the sliding inner diameter section 29 of the cylinder main body 15 at a position in the vicinity of the attachment hole 25 of the opening section 16 side. An annular piston seal 45 is disposed in the circumferential groove 32 to be held in the circumferential groove 32.

An annular opening groove 47 recessed outward in the cylinder radial direction is formed at the opening section 16 side of the circumferential groove 32 in the sliding inner diameter section 29 of the cylinder main body 15 such that a communication hole 46 punched from the attachment hole 25 of the opening section 16 side is opened in the tubular section 14. Here, the opening groove 47 and the communication hole 46 mainly constitute a primary supply path (a supply path) 48 configured to come in constant communication with the reservoir 12 formed in the cylinder main body 15.

A communication groove (not shown) opened in the circumferential groove 32 and extending from the circumferential groove 32 toward the bottom section 13 in a linear shape in the cylinder axial direction is formed closer to the bottom section 13 side than the circumferential groove 32 of the sliding inner diameter section 29 of the cylinder main body 15 to be recessed outward in the cylinder radial direction. The communication groove brings the primary discharge path 27 disposed adjacent to the circumferential groove 31 of the secondary discharge path 26 and the primary discharge path 27 in communication with the circumferential groove 32 via a primary pressure chamber 85 (to be described below).

The circumferential groove 33 is formed at a side of the opening groove 47 opposite to the circumferential groove 32 in the sliding inner diameter section 29 of the cylinder main body 15, i.e., the opening section 16 side of the cylinder main body 15. An annular compartment seal is disposed in the circumferential groove 33 to be held in the circumferential groove 33.

The secondary piston 19 disposed at the bottom section 13 side of the cylinder main body 15 is formed in a shape having a first cylindrical section 55, a bottom section 56 formed at one side in the axial direction of the first cylindrical section 55, and a second cylindrical section 57 disposed at a side of the bottom section 56 opposite to the first cylindrical section 55. The inner circumferential hole 22 is formed by the first cylindrical section 55 and the bottom section 56 among these. The secondary piston 19 is slidably fitted into inner circumferences of the piston seal 35 and the compartment seal 42 installed at the sliding inner diameter section 28 of the cylinder main body 15 in a state in which the first cylindrical section 55 is disposed at the bottom section 13 side of the cylinder main body 15.

An annular stepped section 59 having a stepped shape is formed at an end-side outer circumferential section of the first cylindrical section 55 opposite to the bottom section 56 to be disposed further inside in the radial direction than a maximum outer diameter surface 58 having a largest diameter in the secondary piston 19. A plurality of ports 60 passing in the cylinder radial direction at the bottom section 56 side are radially formed in the stepped section 59 at equal interval positions in the cylinder circumferential direction.

An interval adjustment section 63 including a secondary piston spring 62 configured to determine these intervals in a non-braking state in which there is no input of a pressing force from the output shaft 10 of the brake booster 1 is formed between the secondary piston 19 and the bottom section 13 of the cylinder main body 15. The interval adjustment section 63 has a locking member 64 abutting the bottom section 13 of the cylinder main body 15 and a locking member 65 connected to slide along the locking member 64 only within a predetermined range to abut the bottom section 56 of the secondary piston 19. The secondary piston spring 62 is interposed between the locking member 64 and the locking member 65.

Here, a portion surrounded by the bottom section 13 of the cylinder main body 15, the bottom section 13 side of the tubular section 14 and the secondary piston 19 constitute the secondary pressure chamber (the pressure chamber) 68 configured to generate brake liquid pressure and supply the brake liquid pressure into the secondary discharge path 26. In other words, the secondary piston 19 forms the secondary pressure chamber 68 disposed between the cylinder main body 15 and the secondary piston 19 and configured to supply liquid pressure into the secondary discharge path 26. The secondary pressure chamber 68 is configured to come in communication with the secondary supply path 38, i.e., the reservoir 12, when the secondary piston 19 is disposed at a position at which the port 60 is opened in the opening groove 37.

The compartment seal 42 held in the circumferential groove 31 of the cylinder main body 15 is an integrally formed product formed of a synthetic rubber, and formed in a C shape at one side of a cross section in the radial direction including a centerline thereof. In the compartment seal 42, the inner circumference abuts the outer circumference of the secondary piston 19 moving in the cylinder axial direction, and the outer circumference abuts the circumferential groove 31 of the cylinder main body 15. Accordingly, the compartment seal 42 constantly seals a gap between the secondary piston 19 and a position of the compartment seal 42 of the cylinder main body 15.

The piston seal 35 held in the circumferential groove 30 of the cylinder main body 15 is an integrally formed product formed of a synthetic rubber such as EPDM or the like, and formed in an E shape at one side of a cross section in the radial direction including a centerline thereof. The inner circumference of the piston seal 35 comes into sliding contact with the outer circumference of the secondary piston 19 that moves in the cylinder axial direction. In addition, the outer circumference of the piston seal 35 is configured to abut the circumferential groove 30 of the cylinder main body 15. The piston seal 35 is configured to seal between the secondary supply path 38 and the secondary pressure chamber 68 in a state in which the secondary piston 19 disposes the port 60 closer to the bottom section 13 than the piston seal 35. That is, the piston seal 35 can block communication of the secondary pressure chamber 68 with the secondary supply path 38 and the reservoir 12. In this sealed state, as the secondary piston 19 slides along the sliding inner diameter section 28 of the cylinder main body 15 and the inner circumferences of the piston seal 35 and the compartment seal 42 held by the cylinder main body 15 to move toward the bottom section 13, the brake liquid in the secondary pressure chamber 68 is pressurized. The brake liquid pressurized in the secondary pressure chamber 68 is supplied from the secondary discharge path 26 into the braking cylinder of a wheel side.

When the above-mentioned secondary piston 19 is disposed at the basic position (the non-braking position) at which the port 60 is opened in the opening groove 37 as shown in FIG. 1 with no input of the pressing force from the output shaft 10 of the brake booster 1, the piston seal 35 is configured such that a portion thereof overlaps the port 60 in the stepped section 59 of the secondary piston 19. Then, when the secondary piston 19 moves toward the bottom section 13 of the cylinder main body 15 and the inner circumferential section of the piston seal 35 entirely overlaps the port 60, communication between the secondary pressure chamber 68 and the reservoir 12 is blocked.

The primary piston 18 disposed at the opening section 16 side of the cylinder main body 15 is formed in a shape having a first cylindrical section 71, a bottom section 72 formed at one side in the axial direction of the first cylindrical section 71, and a second cylindrical section 73 formed at a side of the bottom section 72 opposite to the first cylindrical section 71. The inner circumferential hole 21 is defined by the first cylindrical section 71 and the bottom section 72 among these. The primary piston 18 is slidably fitted into each of the inner circumferences of the piston seal 45 and the compartment seal 52 installed at the sliding inner diameter section 29 of the cylinder main body 15 in a state in which the first cylindrical section 71 is disposed at the secondary piston 19 side in the cylinder main body 15. Here, the output shaft 10 of the brake booster 1 is inserted into the second cylindrical section 73 and the bottom section 72 is pressed by the output shaft 10.

An annular concave section 75 having a stepped shape is formed at an end-side outer circumferential section of the first cylindrical section 71 opposite to the bottom section 72 to be disposed further inside in the radial direction than a maximum outer diameter surface 74 having a largest diameter in the primary piston 18. A plurality of ports 76 passing in the radial direction at the bottom section 72 are radially formed in the concave section 75 at equal interval positions in the cylinder circumferential direction.

An interval adjustment section 79 including a primary piston spring 78 configured to determine these intervals in a non-braking state in which there is no input of pressing force from the output shaft 10 of the brake booster 1 is provided between the secondary piston 19 and the primary piston 18. The interval adjustment section 79 has a locking member 81 abutting the bottom section 56 of the secondary piston 19, a locking member 82 abutting the bottom section 72 of the primary piston 18, and a shaft member 83 having one end portion fixed to the locking member 81 and configured to slidably support the locking member 82 within a predetermined range. The primary piston spring 78 is interposed between the locking member 81 and the locking member 82.

Here, a portion surrounded by the tubular section 14 of the cylinder main body 15, the primary piston 18 and the secondary piston 19 constitutes the primary pressure chamber (the pressure chamber) 85 configured to generate the brake liquid pressure and supply brake liquid into the primary discharge path 27. In other words, the primary piston 18 forms the primary pressure chamber 85 configured to supply liquid pressure into the primary discharge path 27 between the secondary piston 19 and the cylinder main body 15. The primary pressure chamber 85 is configured to come in communication with the primary supply path 48, i.e., the reservoir 12, when the primary piston 18 is disposed at a position at which the port 76 is opened in the opening groove 47.

The compartment seal 52 held in the circumferential groove 33 of the cylinder main body 15 is the same part as the compartment seal 42, an integrally formed product formed of a synthetic rubber, and formed in a C shape at one side of a cross section in the radial direction including a centerline thereof. In the compartment seal 52, an inner circumference comes in sliding contact with the outer circumference of the primary piston 18 that slides in the cylinder axial direction, and an outer circumference abuts the circumferential groove 33 of the cylinder main body 15. Accordingly, the compartment seal 52 constantly seals a gap between the primary piston 18 and a position of the compartment seal 52 of the cylinder main body 15.

The piston seal 45 held in the circumferential groove 32 of the cylinder main body 15 is the same part as the piston seal 35, an integrally formed product formed of a synthetic rubber such as EPDM or the like, and formed in an E shape at one side of a cross section in the radial direction including a centerline thereof. The inner circumference of the piston seal 45 comes into sliding contact with the outer circumference of the primary piston 18 that moves in the cylinder axial direction. The outer circumference of the piston seal 45 is configured to abut the circumferential groove 32 of the cylinder main body 15. The piston seal 45 is configured to be able to seal between the primary supply path 48 and the primary pressure chamber 85 in a state in which the primary piston 18 positions the port 76 closer to the bottom section 13 side than the piston seal 45. That is, the piston seal 45 can block communication of the primary pressure chamber 85 with the primary supply path 48 and the reservoir 12. In this sealed state, as the primary piston 18 slides along the inner circumferences of the piston seal 45 and the compartment seal 52 held in the sliding inner diameter section 29 and the cylinder main body 15 of the cylinder main body 15 to move toward the bottom section 13, the brake liquid in the primary pressure chamber 85 is pressurized. The brake liquid pressurized in the primary pressure chamber 85 is supplied from the primary discharge path 27 into the braking cylinder of the wheel side.

When the primary piston 18 is disposed at the basic position (the non-braking position) at which the port 76 is opened in the opening groove 47 as shown in FIG. 1 with no input of the pressing force from the output shaft 10 of the brake booster 1, the piston seal 45 is configured such that a portion thereof overlaps the port 76 in the concave section 75 of the primary piston 18. Then, when the primary piston 18 moves toward the bottom section 13 of the cylinder main body 15 and the inner circumferential section of the piston seal 45 entirely overlaps the port 76, communication between the primary pressure chamber 85 and the reservoir 12 is blocked.

Here, a structure section constituted by the circumferential groove 30 of the cylinder main body 15 and a portion adjacent thereto, the piston seal 35 and a sliding contact portion of the secondary piston 19 with the piston seal 35 is referred to as a seal structure section SS of a secondary side. In addition, a structure section constituted by the circumferential groove 32 of the cylinder main body 15 and a portion adjacent thereto, the piston seal 45 and a sliding contact portion of the primary piston 18 with the piston seal 45 is referred to as a seal structure section SP of a primary side. The piston seal 35 and the piston seal 45 are common parts, and the seal structure section SS of the secondary side and the seal structure section SP of the primary side have the same structure. Accordingly, in the following description, the seal structure section SP of the primary side will be exemplarily described in detail with reference mainly to FIGS. 2 to 5.

Figure 2:
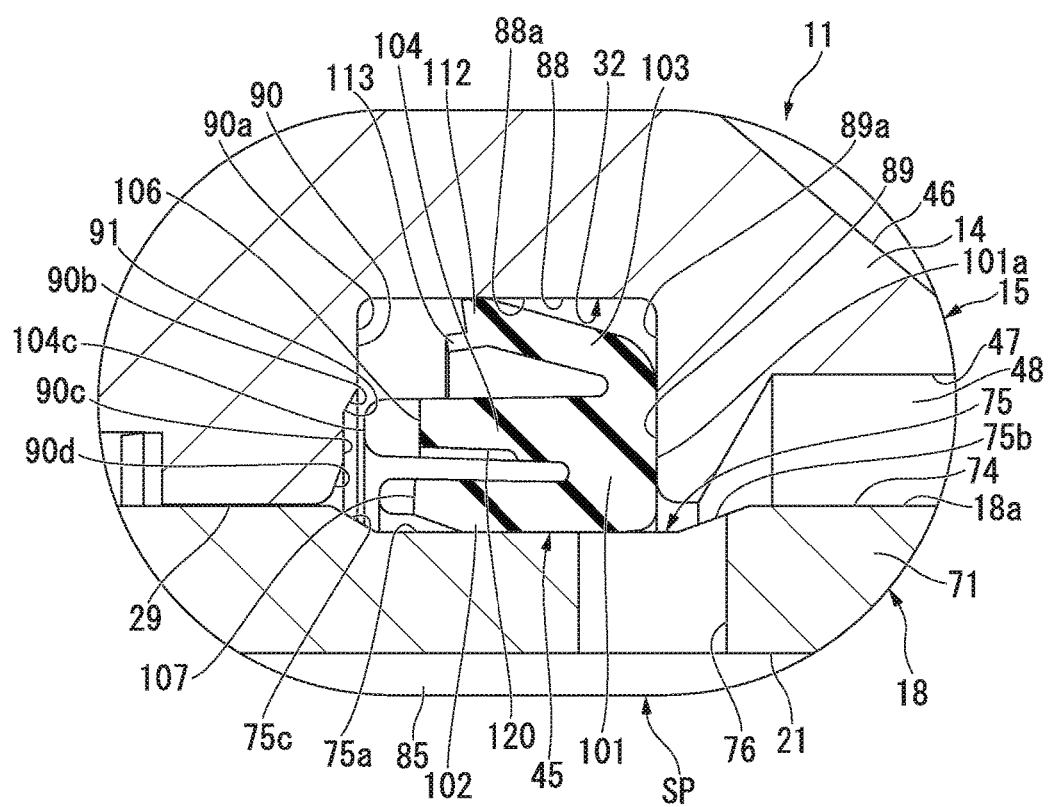
FIG. 2 is a partially enlarged cross-sectional view of a major part of the master cylinder of the embodiment, showing a state in which a piston is disposed at a basic position.

As shown in FIG. 2, the circumferential groove 32 has a groove bottom section (a bottom section of the circumferential groove 32) 88 disposed outside in the cylinder radial direction (at an upper side in FIG. 2). In addition, the circumferential groove 32 has a circumferential wall 89 extending inward in the cylinder radial direction from an edge portion of the opening section 16 side (a right side of FIG. 2, hereinafter referred to as a cylinder opening side) of the cylinder main body 15 in the groove bottom section 88. Further, the circumferential groove 32 has a circumferential wall 90 extending inward in the cylinder radial direction from an edge portion of the bottom section 13 side (a left side of FIG. 2, hereinafter referred to as a cylinder bottom side) of the cylinder main body 15 in the groove bottom section 88. The groove bottom section 88, the circumferential wall 89 and the circumferential wall 90 are integrally formed with the cylinder main body 15, and formed by cutting with respect to the cylinder main body 15.

The groove bottom section 88 has a groove bottom surface 88a. The groove bottom surface 88a is formed in a cylindrical surface about a cylinder axis and has a constant length in the cylinder axial direction.

The circumferential wall 89 has a wall surface 89a. The wall surface 89a is constituted by a flat surface parallel to a surface perpendicular to the cylinder axis. The wall surface 89a is formed to have a constant width in the cylinder radial direction with a constant inner diameter and a constant outer diameter, and formed in an annular shape about the cylinder axis. An edge portion of a large diameter side of the wall surface 89a is connected to an edge portion of a cylinder opening side of the groove bottom surface 88a through round chamfering. An edge portion of a small diameter side of the wall surface 89a is connected to the sliding inner diameter section 29 through round chamfering.

The circumferential wall 90 opposite to the circumferential wall 89 has an outer wall surface 90a, an intermediate inclined surface 90b, an inner wall surface 90c and an inner inclined surface 90d. The outer wall surface 90a extends inward in the cylinder radial direction from the edge portion of the cylinder bottom side in the groove bottom section 88. The outer wall surface 90a is constituted by a flat surface parallel to the surface perpendicular to the cylinder axis. The outer wall surface 90a is formed to have a constant width in the cylinder radial direction with a constant inner diameter and a constant outer diameter, and formed in an annular shape about the cylinder axis.

The intermediate inclined surface 90b extends inward in the cylinder radial direction from the inner edge portion of the cylinder radial direction of the outer wall surface 90a to be inclined with respect to the cylinder axis to be disposed further inward in the cylinder radial direction at a cylinder bottom side. In other words, the intermediate inclined surface 90b extends from the inner edge portion in the cylinder radial direction of the outer wall surface 90a toward the cylinder bottom side to be formed in a tapered shape with a diameter that reduces toward the cylinder bottom side. The intermediate inclined surface 90b is formed to have a constant width in the cylinder radial direction and a constant length in the cylinder axial direction.

The inner wall surface 90c extends inward in the cylinder radial direction from the inner edge portion in the cylinder radial direction of the intermediate inclined surface 90b. The inner wall surface 90c is constituted by a flat surface parallel to the surface perpendicular to the cylinder axis. The inner wall surface 90c is formed to have a constant width in the cylinder radial direction with a constant inner diameter and a constant outer diameter, and formed in an annular shape about the cylinder axis.

The inner inclined surface 90d extends inward in the cylinder radial direction from the inner edge portion of the cylinder radial direction of the inner wall surface 90c to be inclined with respect to the cylinder axis to be disposed further inward in the cylinder radial direction at the cylinder bottom side. In other words, the inner inclined surface 90d extends from the inner edge portion of the cylinder radial direction of the inner wall surface 90c toward the cylinder bottom side to be formed in a tapered shape with a diameter that reduces toward the cylinder bottom side. The inner inclined surface 90d is formed to have a constant width in the cylinder radial direction and a constant length in the cylinder axial direction.

An edge portion of a large diameter side of the outer wall surface 90a is connected to an edge portion of a cylinder opening side of the groove bottom surface 88a through round chamfering. An edge portion of a small diameter side of the inner inclined surface 90d is connected to the sliding inner diameter section 29 through round chamfering.

Accordingly, a stepped section 91 in which the inside in the radial direction is closer to the cylinder bottom side than the outside in the radial direction is formed at an intermediate portion in the radial direction of the circumferential wall 90. The stepped section 91 includes a portion of the intermediate inclined surface 90b side of the outer wall surface 90a, the intermediate inclined surface 90b, and a portion of the intermediate inclined surface 90b side of the inner wall surface 90c. As the intermediate inclined surface 90b having the tapered shape is disposed between the inner wall surface 90c and the outer wall surface 90a, the inner wall surface 90c is formed to be offset closer to the cylinder bottom side than the outer wall surface 90a. Accordingly, the width in the cylinder axial direction between the outer wall surface 90a and the wall surface 89a of the circumferential wall 89, which are parallel to each other, is smaller than the width in the cylinder axial direction between the inner wall surface 90c and the wall surface 89a of the circumferential wall 89, which are parallel to each other. The width in the cylinder radial direction of the intermediate inclined surface 90b is smaller than the width in the cylinder radial direction of the outer wall surface 90a and smaller than the width in the cylinder radial direction of the inner wall surface 90c. The intermediate inclined surface 90b forms an obtuse angle with the inner wall surface 90c.

The concave section 75 formed in the primary piston 18 has a cylindrical surface 75a, a tapered surface 75b and a tapered surface 75c. The cylindrical surface 75a is formed to have a diameter smaller than the maximum outer diameter surface 74 formed in a cylindrical surface that has the largest diameter in the primary piston 18, and formed to have a constant width in the axial direction. The tapered surface 75b is inclined and extends so as to have a larger diameter from the edge portion of the cylinder opening side of the cylindrical surface 75a toward the cylinder opening side to be connected to a portion closer to the cylinder opening side than the concave section 75 of the maximum outer diameter surface 74. The tapered surface 75c is inlined and extends so as to have a larger diameter from the edge portion of the cylinder bottom side of the cylindrical surface 75a toward the cylinder bottom side to be connected to a portion closer to the cylinder bottom side than the concave section 75 of the maximum outer diameter surface 74.

The cylindrical surface 75a, the tapered surface 75b and the tapered surface 75c are formed about the central axis of the primary piston 18 like the maximum outer diameter surface 74. The ports 76 in constant communication with the primary pressure chamber 85 are formed at positions that bridge the cylindrical surface 75a and the tapered surface 75b, in other words, the end portion of the cylinder bottom side is disposed at the cylindrical surface 75a and the end portion of the cylinder opening side is disposed at the tapered surface 75b.

The piston seal 45 disposed in the circumferential groove 32 has a base section 101, an inner circumferential lip section 102, an outer circumferential lip section 103 and an intermediate protrusion section 104. The base section 101 is disposed at the cylinder opening side (a right side of FIG. 2) of the piston seal 45, and formed in an annular plate shape parallel to a surface perpendicular to the axis of the piston seal 45. The inner circumferential lip section 102 is formed in an annular cylinder shape protruding from the inner circumferential edge portion of the base section 101 toward the cylinder bottom side (a left side of FIG. 2) in the cylinder axial direction. The outer circumferential lip section 103 is formed in an annular cylinder shape protruding from the outer circumferential edge portion of the base section 101 toward the cylinder bottom side in the cylinder axial direction. The intermediate protrusion section 104 is disposed between the outer circumferential lip section 103 and the inner circumferential lip section 102 and formed in an annular cylinder shape protruding from the base section 101 toward the cylinder bottom side in the cylinder axial direction. The intermediate protrusion section 104 has a protrusion quantity from the base section 101 larger than a protrusion quantity from the base section 101 of the inner circumferential lip section 102 and the outer circumferential lip section 103.

In the piston seal 45, the inner circumferential lip section 102 comes in sliding contact with the outer circumferential surface 18a including the cylindrical surface 75a, the tapered surface 75b, the tapered surface 75c and the maximum outer diameter surface 74 of the primary piston 18 that moves in the cylinder axial direction, and the outer circumferential lip section 103 abuts the groove bottom surface 88a of the groove bottom section 88 of the circumferential groove 32 of the cylinder main body 15.

The piston seal 45 in a natural state before being incorporated into the master cylinder 11 will be described with reference to FIGS. 3A, 3B and 4. The base section 101, the inner circumferential lip section 102, the outer circumferential lip section 103 and the intermediate protrusion section 104 coincide with the central axis, and the central axis is a central axis of the piston seal 45. Hereinafter, a central axial direction of the piston seal 45 is referred to as a seal axial direction, a circumferential direction of the piston seal 45 is referred to as a seal circumferential direction, and a radial direction of the piston seal 45 is referred to as a seal radial direction. In addition, the base section 101 side in the axial direction will be described as a back side, and a protrusion side of the inner circumferential lip section 102, the outer circumferential lip section 103 and the intermediate protrusion section 104 from the base section 101 in the axial direction will be described as a front side.

Figure 3A:
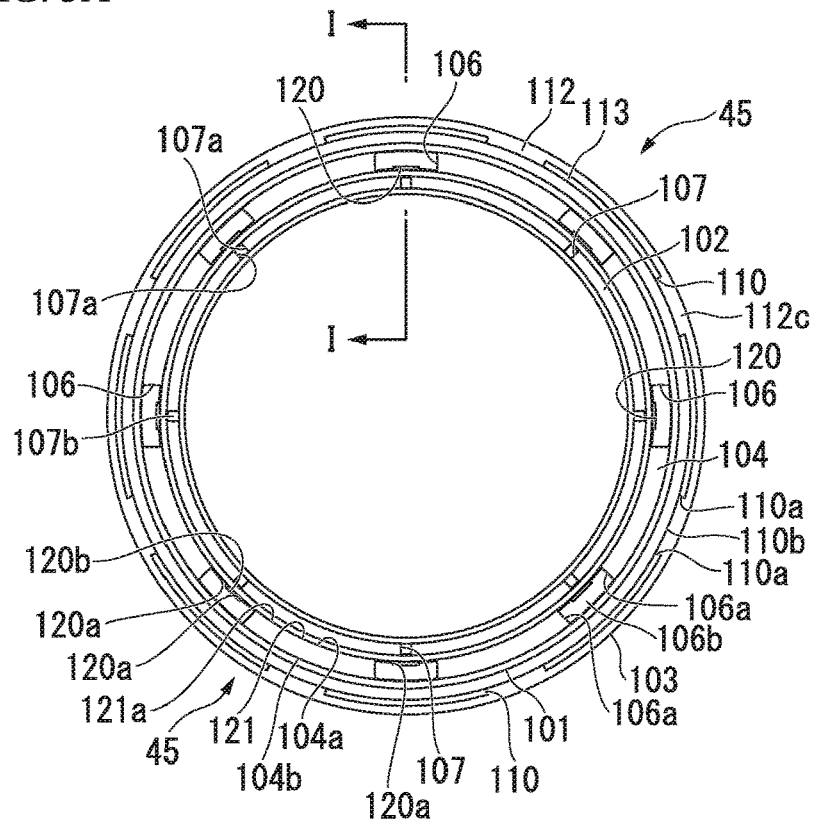
FIG. 3A is a front view showing a piston seal of the master cylinder of the embodiment according to the present invention.
Figure 3B:
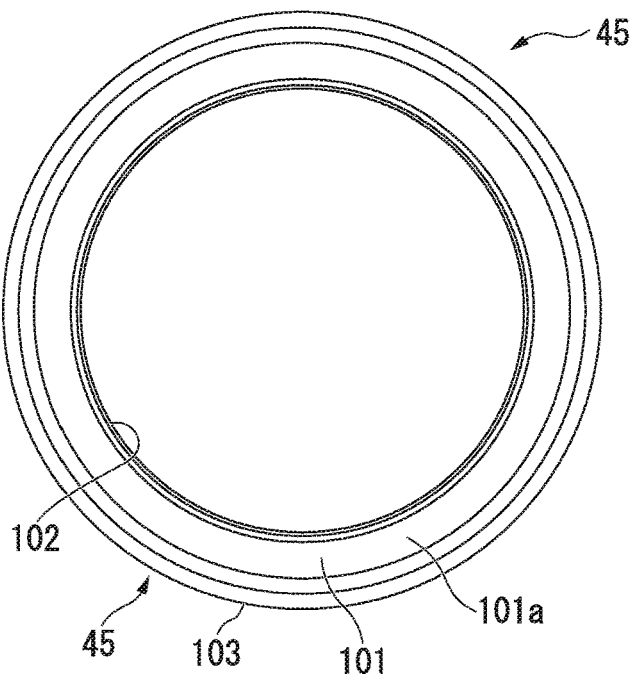
FIG. 3B is a rear view showing the piston seal of the master cylinder of the embodiment according to the present invention.

As shown in FIG. 3A, a plurality of (in the embodiment, eight) intermediate grooves 106 are formed in the piston seal 45 at an extension front end side of the intermediate protrusion section 104 at equal intervals in the seal circumferential direction. In addition, a plurality of (in the embodiment, eight, which is equal to the number of intermediate grooves 106) inner lip grooves 107 are formed in the piston seal 45 at an extension front end side of the inner circumferential lip section 102 at equal intervals in the seal circumferential direction. The inner lip groove 107 has a width in the seal circumferential direction that is smaller than that in the seal circumferential direction of the intermediate groove 106. In addition, a plurality of (in the embodiment, eight, which is equal to the number of intermediate grooves 106) outer lip grooves 110 are formed in the piston seal 45 at an extension front end side of the outer circumferential lip section 103 at equal intervals in the seal circumferential direction.

In the one intermediate groove 106 and the one inner lip groove 107, central positions in the seal circumferential direction are matched in the seal circumferential direction, and thus a plurality of sets (in the embodiment, eight sets) of the intermediate grooves 106 and the inner lip grooves 107 parallel to the seal radial direction are formed at equal intervals in the seal circumferential direction. In addition, in the outer lip groove 110, a central position in the seal circumferential direction is matched to a central position in the seal circumferential direction between the intermediate groove 106 and the intermediate groove 106 that are adjacent to each other in the seal circumferential direction. As a result, the sets of the intermediate grooves 106 and the inner lip grooves 107, and the outer lip grooves 110 are alternately disposed in the seal circumferential direction.

Figure 4:
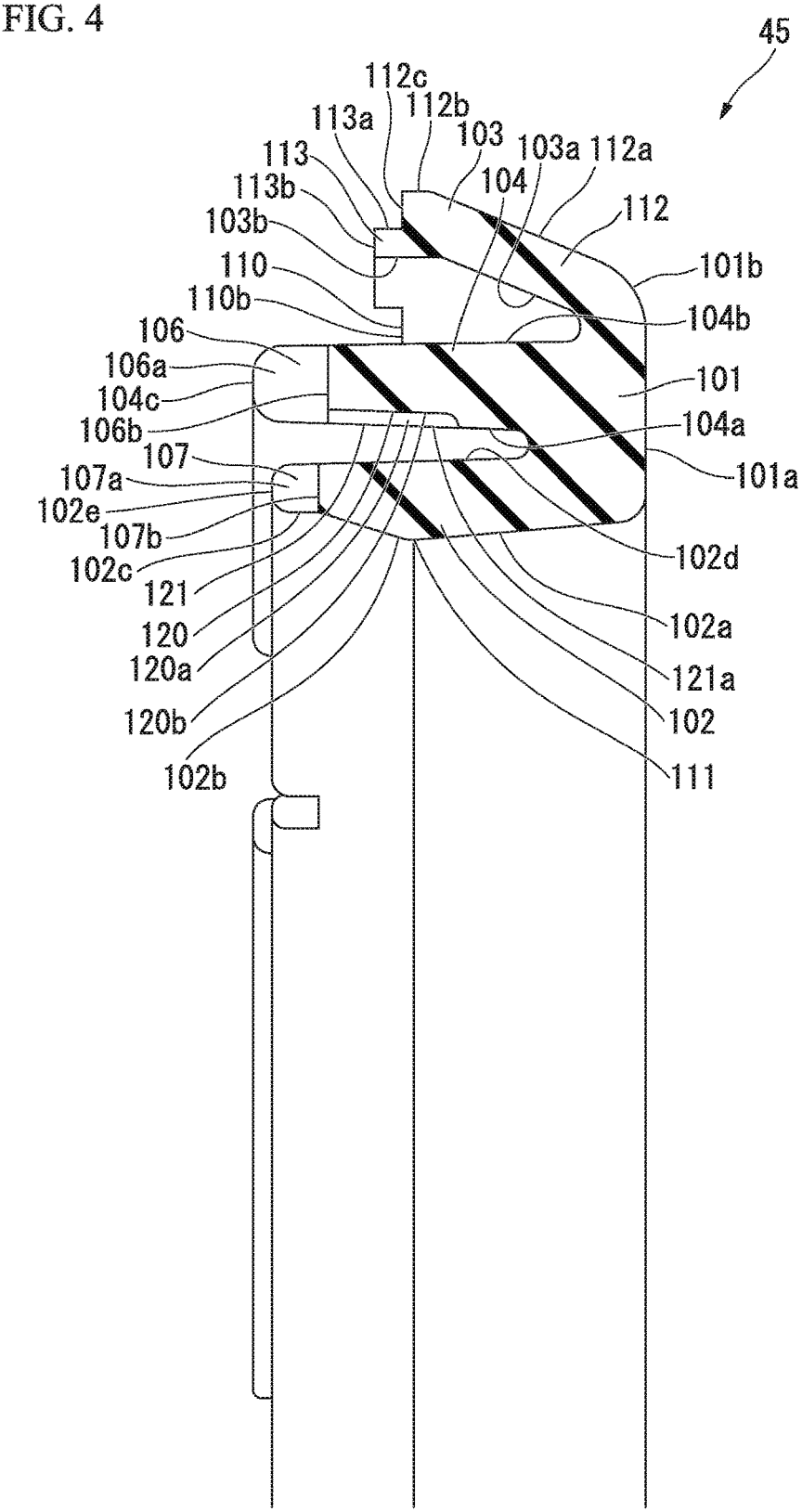
FIG. 4 is a cross-sectional view taken along line I-I of FIG. 3A showing the piston seal of the master cylinder of the embodiment according to the present invention.

As shown in FIG. 4, the intermediate groove 106 passes through the intermediate protrusion section 104 in the seal radial direction. The inner lip groove 107 passes through the inner circumferential lip section 102 in the seal radial direction. The outer lip groove 110 passes through the outer circumferential lip section 103 in the seal radial direction.

The base section 101 has a back surface 101a and a curved surface 101b. The back surface 101a is disposed at an end portion of the side located furthest back in the seal axial direction of the piston seal 45, and constituted by a flat surface parallel to the surface perpendicular to the axis of the piston seal 45. The back surface 101a is formed to have a constant width in the radial direction with a constant inner diameter and a constant outer diameter, and formed in an annular shape about the central axis of the piston seal 45.

The curved surface 101b is inclined such that a portion outward in the radial direction is disposed further forward. In the curved surface 101b, a shape of a cross section including the central axis of the piston seal 45 is formed in an arc shape having a center inside in the base section 101. The curved surface 101b is formed to have a certain width in the seal radial direction with a constant inner diameter and a constant outer diameter, and formed to have a constant length in the seal axial direction. The curved surface 101b is formed in an annular shape about the central axis of the piston seal 45.

The inner circumferential lip section 102 is formed in a tapered cylindrical shape having a slightly smaller diameter as a whole as it is separated from the base section 101 in the seal axial direction. A decreased-diameter inner circumferential surface 102a, an increased-diameter inner circumferential surface 102b and a cylindrical inner circumferential surface 102c are formed at inner circumferential sides of the base section 101 and the inner circumferential lip section 102 in sequence from the back side in the axial direction. The decreased-diameter inner circumferential surface 102a is formed over the base section 101 and the inner circumferential lip section 102. The decreased-diameter inner circumferential surface 102a is formed in a tapered shape about the central axis of the piston seal 45 to have a smaller diameter (i.e., a diameter is reduced) as it extends toward the front side from the inside in the seal radial direction of the back surface 101a. The decreased-diameter inner circumferential surface 102a is formed to have a constant length in the seal axial direction.

The increased-diameter inner circumferential surface 102b is formed at the inner circumferential lip section 102. The increased-diameter inner circumferential surface 102b is formed in a tapered shape about the central axis of the piston seal 45 to have a larger diameter (i.e., a diameter is increased) as it extends toward the front side from the edge portion of the front side in the seal axial direction of the decreased-diameter inner circumferential surface 102a. The increased-diameter inner circumferential surface 102b is formed to have a constant length in the seal axial direction.

The cylindrical inner circumferential surface 102c is formed at the inner circumferential lip section 102 and extends toward the front side from the edge portion of the front side in the seal axial direction of the increased-diameter inner circumferential surface 102b. As the plurality of inner lip grooves 107 are formed in the inner circumferential lip section 102, the cylindrical inner circumferential surface 102c is formed to intermittently configure a portion of a cylindrical surface on the same cylindrical surface about the central axis of the piston seal 45. The cylindrical inner circumferential surface 102c is formed to have a constant length in the seal axial direction.

A decreased-diameter outer circumferential surface 102d is formed at an outer circumferential side of the inner circumferential lip section 102. The decreased-diameter outer circumferential surface 102d extends to the front side in the seal axial direction and is formed in a tapered cylindrical shape about the central axis of the piston seal 45 to have a smaller diameter (i.e., a diameter is reduced) toward the front side in the seal axial direction. In the decreased-diameter outer circumferential surface 102d, a portion at which the inner lip groove 107 is formed is formed to have a constant length in the seal axial direction, and a portion at which the inner lip groove 107 is not formed is formed to have a constant length in the seal axial direction.

A front end surface 102e of the side of the inner circumferential lip section 102 located furthest forward is formed parallel to the surface perpendicular to the axis of the piston seal 45. The front end surface 102e is formed to have a constant width in the seal radial direction with a constant inner diameter and a constant outer diameter. The front end surface 102e is formed to intermittently configure a portion of a plane on the same plane parallel to the surface perpendicular to the axis of the piston seal 45 due to the formation of the plurality of inner lip grooves 107. The front end surface 102e is disposed at a position on the same circle about the central axis of the piston seal 45. An edge portion inside in the seal radial direction of the back surface 101a is connected to an edge portion of the back side of the decreased-diameter inner circumferential surface 102a through round chamfering. An edge portion of the front side of the cylindrical inner circumferential surface 102c is connected to an edge portion inside in the seal radial direction of the front end surface 102e through round chamfering. An edge portion of the front side of the decreased-diameter outer circumferential surface 102d is connected to an edge portion outside in the seal radial direction of the front end surface 102e through round chamfering.

In the inner circumferential lip section 102, a boundary portion between the decreased-diameter inner circumferential surface 102a and the increased-diameter inner circumferential surface 102b is a minimum diameter section 111 having a smallest inner diameter. The minimum diameter section 111 is formed in a circular shape about the central axis of the piston seal 45. The minimum diameter section 111 is a portion having a smallest inner diameter even in the piston seal 45.

As shown in FIG. 3A, each of the plurality of inner lip grooves 107 has a pair of opposite surfaces 107a (an opposite surface 107a and an opposite surface 107a), and a bottom surface 107b. The pair of the opposite surfaces 107a are each disposed along a radius line of the piston seal 45 and formed in the seal axial direction, and are formed parallel to each other. The plurality of bottom surfaces 107b of the plurality of inner lip grooves 107 are disposed to intermittently configure a portion on the same plane parallel to the surface perpendicular to the axis of the piston seal 45. The plurality of bottom surfaces 107b are disposed at positions on the same circle about the central axis of the piston seal 45.

As shown in FIG. 4, the outer circumferential lip section 103 is formed in a tapered cylindrical shape about the central axis of the piston seal 45 to have a larger diameter as a whole as it extends toward the front side in the seal axial direction.

The outer circumferential lip section 103 is constituted by a main body section 112 extending from the base section 101, and a thin section 113 disposed at an end portion of the main body section 112 opposite to the base section 101 and having a smaller thickness in the seal radial direction than that of the main body section 112. The thin section 113 is formed at an inner end position in the seal radial direction of a front side end portion of the main body section 112. The above-mentioned outer lip groove 110 is formed in the thin section 113.

An increased-diameter inner circumferential surface 103a and a cylindrical inner circumferential surface 103b are formed at the inner circumferential side of the outer circumferential lip section 103 in sequence from the back side in the seal axial direction. The increased-diameter inner circumferential surface 103a is formed in a tapered shape about the central axis of the piston seal 45 to have a larger diameter (i.e., a diameter is increased) as it extends toward the front side in the seal axial direction. The increased-diameter inner circumferential surface 103a has a constant length in the seal axial direction. The cylindrical inner circumferential surface 103b is formed in a cylindrical surface shape about the central axis of the piston seal 45 extending from the edge portion of the front side of the increased-diameter inner circumferential surface 103a. In the cylindrical inner circumferential surface 103b, a portion at which the outer lip groove 110 is formed has a constant length in the seal axial direction, and a portion at which the outer lip groove 110 is not formed has a constant length in the seal axial direction.

The above-mentioned curved surface 101b, an increased-diameter outer circumferential surface 112a and a cylindrical outer circumferential surface 112b are formed at the main body section 112 of the outer circumferential lip section 103 and the outer circumferential side of the base section 101 in sequence from the back side in the seal axial direction. The increased-diameter outer circumferential surface 112a is formed over the base section 101 and the main body section 112. The increased-diameter outer circumferential surface 112a is formed in a tapered shape about the central axis of the piston seal 45 to have a larger diameter (i.e., a diameter is increased) from the edge portion of the front side of the curved surface 101b as it extends toward the front side in the seal axial direction. The increased-diameter outer circumferential surface 112a is formed to have a constant length in the seal axial direction. The cylindrical outer circumferential surface 112b is formed in a cylindrical surface shape about the central axis of the piston seal 45 extending from the edge portion of the front side of the increased-diameter outer circumferential surface 112a. The cylindrical outer circumferential surface 112b is formed to have a constant length in the seal axial direction. A front end surface 12c of the front side of the main body section 112 is formed to have a flat surface parallel to the surface perpendicular to the axis of the piston seal 45, and the thin section 113 protrudes from the front end surface 112c.

The thin section 113 has a cylindrical outer circumferential surface 113a. As the plurality of outer lip grooves 110 are formed in the thin section 113, the cylindrical outer circumferential surface 113a is formed to intermittently configure a portion of the cylindrical surface about the central axis of the piston seal 45. A front end surface 113b of the thin section 113 configures a front end surface of the outer circumferential lip section 103. The front end surface 113b is formed to have a constant width in the seal radial direction with a constant inner diameter and a constant outer diameter. As the plurality of outer lip grooves 110 are formed in the thin section 113, a portion of the plane is formed to be intermittently configured on the same plane parallel to the surface perpendicular to the axis of the piston seal 45. The front end surface 113b is formed on the same circle about the central axis of the piston seal 45.

As shown in FIG. 3A, each of the plurality of outer lip grooves 110 has a pair of opposite surfaces 110a (an opposite surface 110a and an opposite surface 110a), and a bottom surface 110b. The pair of the opposite surfaces 110a are disposed along a radius line of the piston seal 45 in the seal axial direction, and formed parallel to each other. The bottom surface 110b is constituted by a portion of the front end surface 112c of the main body section 112. The plurality of bottom surfaces 110b of the plurality of outer lip grooves 110 are disposed to intermittently configure the portion on the same plane parallel to the surface perpendicular to the axis of the piston seal 45. The plurality of bottom surfaces 110b are disposed at positions on the same circle about the central axis of the piston seal 45.

As shown in FIG. 4, an increased-diameter inner circumferential surface 104a is formed at an inner circumferential side of the intermediate protrusion section 104. The increased-diameter inner circumferential surface 104a is formed in a tapered shape about the central axis of the piston seal 45 and extends from the base section 101 to have a slightly larger diameter toward the front side in the seal axial direction. The intermediate groove 106 and an inner circumferential side groove 120 (to be described below) are formed in the intermediate protrusion section 104 to match positions in the seal circumferential direction. For this reason, in the increased-diameter inner circumferential surface 104a, a portion at which the intermediate groove 106 is not formed has a constant length in the seal axial direction. In the increased-diameter inner circumferential surface 104a, a portion at which the intermediate groove 106 is formed and the inner circumferential side groove 120 is not formed has a constant length in the seal axial direction. In the increased-diameter inner circumferential surface 104a, a portion at which the inner circumferential side groove 120 is formed has a constant length in the seal axial direction.

A decreased-diameter outer circumferential surface 104b is formed at an outer circumferential side of the intermediate protrusion section 104. The decreased-diameter outer circumferential surface 104b is formed in a tapered shape about the central axis of the piston seal 45 and extends from the base section 101 to have a slightly smaller diameter toward the front side in the seal axial direction. The intermediate groove 106 is formed in the intermediate protrusion section 104. For this reason, in the decreased-diameter outer circumferential surface 104b, a portion at which the intermediate groove 106 is not formed has a constant length in the seal axial direction. In the decreased-diameter outer circumferential surface 104b, a portion in which the intermediate groove 106 is formed has a constant length in the seal axial direction.

A front end surface 104c of the front side of the intermediate protrusion section 104 is formed parallel to the surface perpendicular to the axis of the piston seal 45, and formed to have a constant width in the seal radial direction with a constant inner diameter and a constant outer diameter. As the plurality of intermediate grooves 106 are formed in the intermediate protrusion section 104, the front end surface 104c is formed to intermittently configure a portion of the plane on the same plane parallel to the surface perpendicular to the axis of the piston seal 45. The front end surface 104c is disposed at a position on the same circle about the central axis of the piston seal 45.

An edge portion of a front side of the increased-diameter inner circumferential surface 104a is connected to an edge portion inside in the seal radial direction of the front end surface 104c through round chamfering. An edge portion of a front side of the decreased-diameter outer circumferential surface 104b is connected to an edge portion outside in the seal radial direction of the front end surface 104c through round chamfering. An edge portion of a back side of the increased-diameter inner circumferential surface 104a is connected to an edge portion of the back side of the decreased-diameter outer circumferential surface 102d of the inner circumferential lip section 102 through round chamfering. An edge portion of a back side of the decreased-diameter outer circumferential surface 104b is connected to an edge portion of the back side of the increased-diameter inner circumferential surface 103a of the outer circumferential lip section 103 through round chamfering.

As shown in FIG. 3A, each of the plurality of intermediate grooves 106 has a pair of opposite surfaces 106a (an opposite surface 106a and an opposite surface 106a), and a bottom surface 106b. The pair of the opposite surfaces 106a are disposed along a radius line of the piston seal 45 in the seal axial direction, and formed parallel to each other. The plurality of bottom surfaces 106b are disposed to intermittently configure portions thereof on the same plane parallel to the surface perpendicular to the axis of the piston seal 45. The plurality of bottom surfaces 106b are disposed at positions on the same circle about the central axis of the piston seal 45.

As shown in FIG. 4, the inner circumferential side groove 120 recessed outward in the seal radial direction is formed in the increased-diameter inner circumferential surface 104a of the inner circumferential lip section 102 side of the intermediate protrusion section 104. The inner circumferential side groove 120 is formed in a slit shape extending from the base section 101 side of the intermediate protrusion section 104 in the seal axial direction to be opened at the front end side of the intermediate protrusion section 104. In the inner circumferential side groove 120, the end portion of the base section 101 side is disposed closer to the front side in the seal axial direction, i.e., the intermediate groove 106 side, than the base section 101.

As shown in FIG. 3A, the plurality of (in the embodiment, eight, which is equal to the number of intermediate grooves 106) inner circumferential side grooves 120 are formed at equal intervals in the seal circumferential direction. The inner circumferential side groove 120 has a width in the seal circumferential direction that is smaller than the width in the seal circumferential direction of the intermediate groove 106. Each central position in the seal circumferential direction of all of the inner circumferential side grooves 120 matches a central position in the seal circumferential direction of the corresponding intermediate groove 106 and a position in the seal circumferential direction. Accordingly, the inner circumferential side groove 120 passes through the bottom surface 106b of the intermediate groove 106 to be opened in the intermediate groove 106.

A groove depth of the inner circumferential side groove 120 is formed to a depth to maintain a state in which it is opened in the intermediate groove 106 even when the front end side of the intermediate protrusion section 104 comes in contact with the front end side of the inner circumferential lip section 102.

As shown in FIG. 4, the inner circumferential side groove 120 has a pair of wall surfaces 120a (a wall surface 120a and a wall surface 120a), and a bottom surface 120b. The pair of the wall surfaces 120a are disposed along a radius line of the piston seal 45 in the seal axial direction, and formed parallel to each other. The bottom surface 120b is formed in a flat surface shape. As shown in FIG. 4, an end portion of the base section 101 side of the bottom surface 120b is connected to the increased-diameter inner circumferential surface 104a through round chamfering. The piston seal 45 includes the inner circumferential side groove 120, the intermediate groove 106, the inner lip groove 107 and the outer lip groove 110 and is formed by integral molding.

As shown in FIG. 3A, as the plurality of inner circumferential side grooves 120 are formed, an inner circumferential side protrusion section 121 protruding inward in the seal radial direction is formed between the inner circumferential side groove 120 and the inner circumferential side groove 120 that are adjacent to each other in the seal circumferential direction. The inner circumferential side protrusion section 121 extends from the base section 101 side of the intermediate protrusion section 104 to the front end side in the seal axial direction. The inner circumferential side protrusion sections 121 are formed to be equal in number to the inner circumferential side grooves 120 at equal intervals in the seal circumferential direction. The inner circumferential side protrusion section 121 has opposite sides in the seal circumferential direction that constitute the pair of the wall surfaces 120a, and a top surface 121a that connects the wall surfaces 120a. The top surface 121a is a portion of the increased-diameter inner circumferential surface 104a. A length in the seal circumferential direction of the inner circumferential side protrusion section 121 is larger than the length in the seal circumferential direction of the inner circumferential side groove 120.

Next, the piston seal 45 in a basic state (a non-braking state before the brake pedal is operated) in which the piston seal 45 is incorporated in the master cylinder 11 to come in appropriate contact with the cylindrical surface 75a of the concave section 75 of the primary piston 18 and separated from the circumferential wall 90 will be described with reference to FIG. 2.

When the piston seal 45 is in the basic state, the piston seal 45 is disposed such that the base section 101 is positioned closest to the cylinder opening side (the right side of FIG. 2) in the orientation parallel to the surface perpendicular to the cylinder axis. Accordingly, the base section 101 is disposed to face the circumferential wall 89 of the circumferential groove 32 and abuts the wall surface 89a of the circumferential wall 89.

In addition, the inner circumferential lip section 102 formed at the innermost circumferential side comes in contact with the cylindrical surface 75a of the outer circumferential section of the primary piston 18 in the inner circumferential section thereof. In this state, the inner circumferential lip section 102 has a cylindrical shape about the cylinder axis. As the primary piston 18 moves in the cylinder axial direction, the inner circumferential section of the inner circumferential lip section 102 comes in sliding contact with an outer circumferential surface 18a of the primary piston 18.

When the piston seal 45 is in the basic state, the outer circumferential lip section 103 of the piston seal 45 formed at the outermost circumferential side abuts the groove bottom surface 88a of the groove bottom section 88 of the circumferential groove 32 in the outer circumferential section thereof. In addition, the intermediate protrusion section 104 has the same orientation as in the natural state and a cylindrical shape about the cylinder axis, and the front end surface 104c thereof is formed parallel to the surface perpendicular to the cylinder axis. The intermediate protrusion section 104 extends closer to the cylinder bottom side (the left side of FIG. 2) than the inner circumferential lip section 102 and the outer circumferential lip section 103, and the front end surface 104c thereof is disposed to face and abut the circumferential wall 90 of the circumferential groove 32.

More specifically, the front end surface 104c of the intermediate protrusion section 104 overlaps positions in the cylinder radial direction of the intermediate inclined surface 90b and the inner wall surface 90c, in other words, the intermediate inclined surface 90b and the inner wall surface 90c are opposite to each other in the cylinder axial direction.

As a result, when the piston seal 45 moves to the cylinder bottom side from the basic state, the front end surface 104c of the intermediate protrusion section 104 abuts the inner wall surface 90c of the circumferential wall 90. That is, the piston seal 45 abuts the inner wall surface 90c before the outer wall surface 90a of the circumferential wall 90 when moving to the cylinder bottom side. In other words, the inner wall surface 90c is formed at a position so that the intermediate protrusion section 104 abuts the inner wall surface 90c before abutting the outer wall surface 90a when the piston seal 45 moves to the cylinder bottom side.

With no input of pressing force from the output shaft 10 side of the brake booster 1 shown in FIG. 1, as shown in FIG. 2, a position at which the primary piston 18 opens the port 76 in the opening groove 47 is the basic position (the non-braking position) of the primary piston 18. The piston seal 45 is configured such that the inner circumferential lip section 102 and the inner circumferential section of the base section 101 are disposed at a position of the cylindrical surface 75a of the concave section 75 of the primary piston 18 and the inner circumferential section of the base section 101 overlaps the position in the cylinder axial direction at a portion of the port 76 when the primary piston 18 is at the basic position. Here, the intermediate protrusion section 104 is separated from the circumferential wall 90, and the front end surface 104c thereof overlaps a position in the cylinder radial direction of the inner wall surface 90c of the circumferential wall 90.

Then, when there is an input of a pressing force from the output shaft 10 side of the brake booster 1 shown in FIG. 1 and the primary piston 18 moves to the cylinder bottom side, the piston seal 45 moves toward the circumferential wall 90 in the circumferential groove 32 together with the primary piston 18. As a result, the base section 101 of the piston seal 45 is separated from the circumferential wall 89. Together with this, the front end surface 104c of the intermediate protrusion section 104 of the piston seal 45 abuts the inner wall surface 90c of the circumferential wall 90. In this state, movement of the piston seal 45 toward the cylinder bottom side is restricted.

When the primary piston 18 moves further toward the bottom section 13 of the cylinder main body 15, the base section 101 of the piston seal 45, movement to the cylinder bottom side of which is restricted, is lifted onto the tapered surface 75b of the concave section 75. Next, the piston seal 45 goes over the port 76 to close the port 76 and blocks communication between the primary pressure chamber 85 and the primary supply path 48. From this position to within a range in which the primary piston 18 is disposed at the cylinder bottom side, the piston seal 45 blocks between the primary pressure chamber 85 and the primary supply path 48 to seal the primary pressure chamber 85. In this state, basically, a liquid pressure of the primary pressure chamber 85 is greater than the atmospheric pressure of the primary supply path 48. As a result, the brake liquid in the primary pressure chamber 85 is supplied from the primary discharge path 27 shown in FIG. 1 into the braking cylinder of the wheel side.

After closing of the port 76, when the primary piston 18 moves further toward the cylinder bottom side, the base section 101 of the piston seal 45 goes over the tapered surface 75b to be lifted onto the maximum outer diameter surface 74. In addition, the inner circumferential lip section 102 is lifted onto the tapered surface 75b, and then the inner circumferential lip section 102 is lifted onto the maximum outer diameter surface 74. The piston seal 45 moves toward the circumferential wall 89 in the circumferential groove 32 according to an increase in liquid pressure of the primary pressure chamber 85. Accordingly, the base section 101 abuts the circumferential wall 89 while the intermediate protrusion section 104 is separated from the circumferential wall 90.

When the base section 101 of the piston seal 45 abuts the tapered surface 75b of the concave section 75 and is pressed toward the cylinder bottom side by the tapered surface 75b, if the base section 101 cannot smoothly slide on the tapered surface 75b, the base section moves further toward the circumferential wall 90 in the circumferential groove 32 along with movement of the primary piston 18. Then, since a movement range of the piston seal 45 is restricted by the circumferential groove 32, a rotational moment in a direction in which the inner circumferential side moves toward the cylinder bottom side and the outer circumferential side moves toward the cylinder opening side is generated in the piston seal 45. However, here, since the intermediate protrusion section 104 of the piston seal 45 abuts the inner wall surface 90c of the circumferential groove 32 as described above, the intermediate protrusion section 104 abuts the intermediate inclined surface 90b disposed outside in the cylinder radial direction of the inner wall surface 90c with respect to the rotational moment, and restricts the rotation of the piston seal 45 including the intermediate protrusion section 104.

When the brake pedal (not shown) is returned in order to release the braking from the state in which the primary piston 18 is moved to the cylinder bottom side, the primary piston 18 is returned to a standby position shown in FIG. 2 by the interval adjustment section 79 shown in FIG. 1. A capacity of the primary pressure chamber 85 is increased by movement of the primary piston 18. Here, when recovery of the brake liquid via the brake pipeline cannot follow an increase in capacity of the primary pressure chamber 85, after the liquid pressure of the primary supply path 48, which is atmospheric pressure, and the liquid pressure of the primary pressure chamber 85 become equal to each other, the liquid pressure in the primary pressure chamber 85 is a negative pressure, and the liquid pressure of the primary pressure chamber 85 is less than that of the primary supply path 48, which is atmospheric pressure. Then, the negative pressure in the primary pressure chamber 85 separates the base section 101 from the circumferential wall 89 while separating the outer circumferential lip section 103 of the piston seal 45 from the groove bottom section 88. As a result, the brake liquid of the primary supply path 48 is supplied into the primary pressure chamber 85 via a flow path of a gap between the circumferential wall 89 and the base section 101, a gap between the groove bottom section 88 and the outer circumferential lip section 103 and a gap between the circumferential wall 90 and the intermediate groove 106 of the intermediate protrusion section 104. Accordingly, a speed of returning the liquid pressure of the primary pressure chamber 85 from the negative state to atmospheric pressure is increased.

Figure 5:
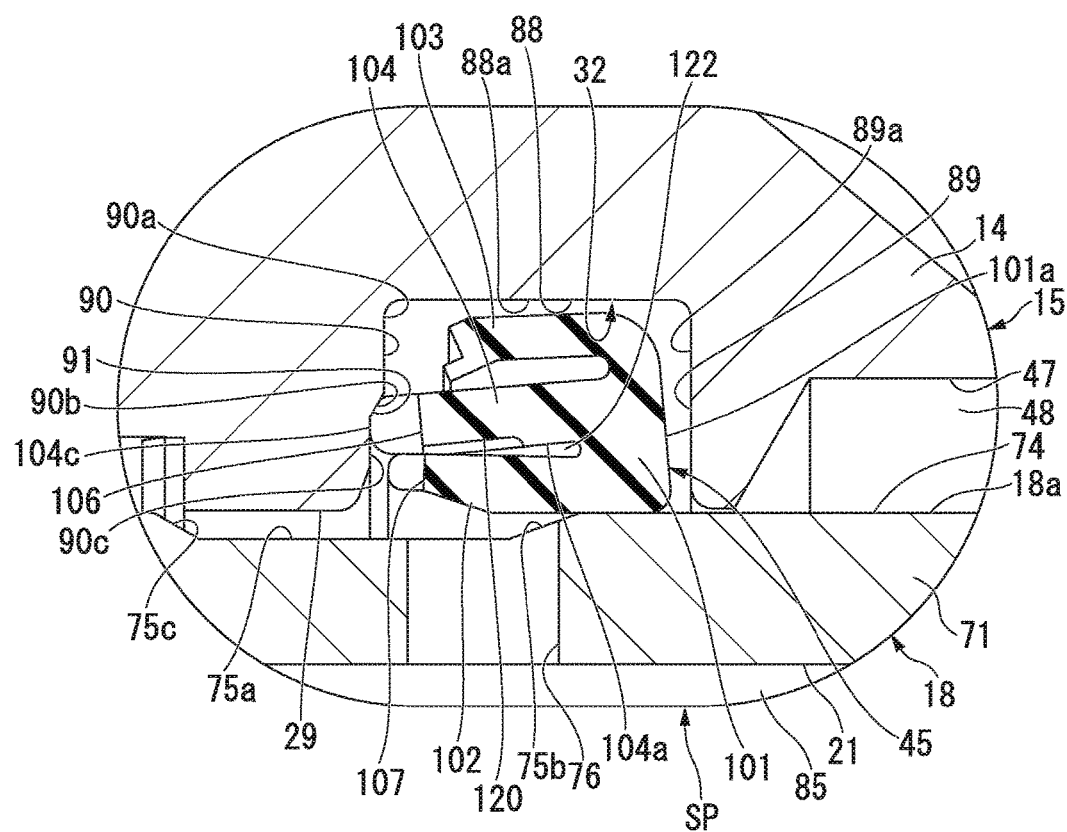
FIG. 5 is a partially enlarged cross-sectional view of the major part of the master cylinder of the embodiment according to the present invention, showing a state in which the piston has advanced from the basic position.

Upon recovery of the above-mentioned brake pedal, since the liquid pressure in the primary pressure chamber 85 becomes the negative pressure, as shown in FIG. 5, the front end portion of the inner circumferential lip section 102 abuts the front end portion of the intermediate protrusion section 104, and then the liquid pressure of the primary pressure chamber 85 is increased toward atmospheric pressure. In this case, when the piston seal disclosed in Patent Literature 1 is used, a pressure in the space surrounded by the inner circumferential lip section, the intermediate protrusion section and the base section that are closed at a negative pressure is less than the pressure therearound, and the inner circumferential lip section and the intermediate protrusion section are not easily separated from each other.

On the other hand, in the embodiment, the inner circumferential side groove 120 extending from the base section 101 side of the intermediate protrusion section 104 in the seal axial direction to be opened at the front end side of the intermediate protrusion section 104 is formed in the increased-diameter inner circumferential surface 104a of the intermediate protrusion section 104 of the piston seal 45. The inner circumferential side groove 120 extends closer to the base section 101 side than an abutting position of the inner circumferential lip section 102 and the intermediate protrusion section 104. As the inner circumferential lip section 102 and the intermediate protrusion section 104 abut each other, while a space 122 is formed between the base sections 101, the inner circumferential lip section 102 and the intermediate protrusion section 104, sealing of the space 122 is suppressed by the inner circumferential side groove 120. That is, the inner circumferential side groove 120 brings the space 122 in communication with the primary pressure chamber 85. Accordingly, occurrence of a state in which the pressure of the space 122 is less than that of the primary pressure chamber 85 can be suppressed. That is, occurrence of a state in which the inner circumferential lip section 102 and the intermediate protrusion section 104 are not easily separated from each other can be suppressed. As a result, the piston seal 45 can be smoothly returned from a deformed state to stable orientation. That is, orientation of the piston seal 45 can be stabilized. In this case, since the inner circumferential lip section 102 is returned from the deformed state, a surface pressure of the inner circumferential lip section 102 to the primary piston 18 is increased to secure sealability between the primary piston 18 and the inner circumferential lip section 102.

Since the inner circumferential side groove 120 is preferably formed in the increased-diameter inner circumferential surface 104a of the piston seal 45, the piston seal 45 can be smoothly returned from the deformed state to the stable orientation with an inexpensive structure in which there is no increase in the number of parts or complication of shapes. However, since the inner circumferential side groove 120 is formed in the intermediate protrusion section 104, partial variation of stiffness according to the position in the seal circumferential direction with respect to the inner circumferential lip section 102 can be suppressed. Further, the intermediate protrusion section 104 is not a seal section such as an inner lip section or the like, and is not an area that is actively deformed. For this reason, as the inner circumferential side groove 120 is formed in the intermediate protrusion section 104, even when a decrease in stiffness or a partial difference in stiffness occurs, problems in performance do not easily occur and there is no influence on sealability even when cracks occur.

Since the plurality of inner circumferential side grooves 120 are formed in the intermediate protrusion section 104 at equal intervals in the circumferential direction, the pressure of the space 122 immediately matches the pressure of the primary pressure chamber 85. Accordingly, the piston seal 45 can be more smoothly returned from the deformed state. Further, while at least one of the inner circumferential side grooves 120 may be formed, the plurality of inner circumferential side grooves 120 may be formed to exhibit an effect of more smoothly returning the piston seal 45 from the deformed state as described above.

In the above-mentioned embodiment, while the seal structure section SP of the primary side including the piston seal 45 has been exemplarily described in detail, the seal structure section SS of the secondary side including the piston seal 35 that is a common part with the piston seal 45 also has the same structure. Accordingly, the seal structure section SS exhibits the same effect as the seal structure section SP.

The piston seal 45 may also be modified like a piston seal 45A of a first variant, a piston seal 45B of a second variant, a piston seal 45C of a third variant and a piston seal 45D of a fourth variant, which will be described below. In addition, the same modification may be made in the piston seal 35. In the following description, common parts of the piston seals 45 and 45A to 45D are represented by the same names and the same reference numerals.

[First Variant]

Figure 6A:
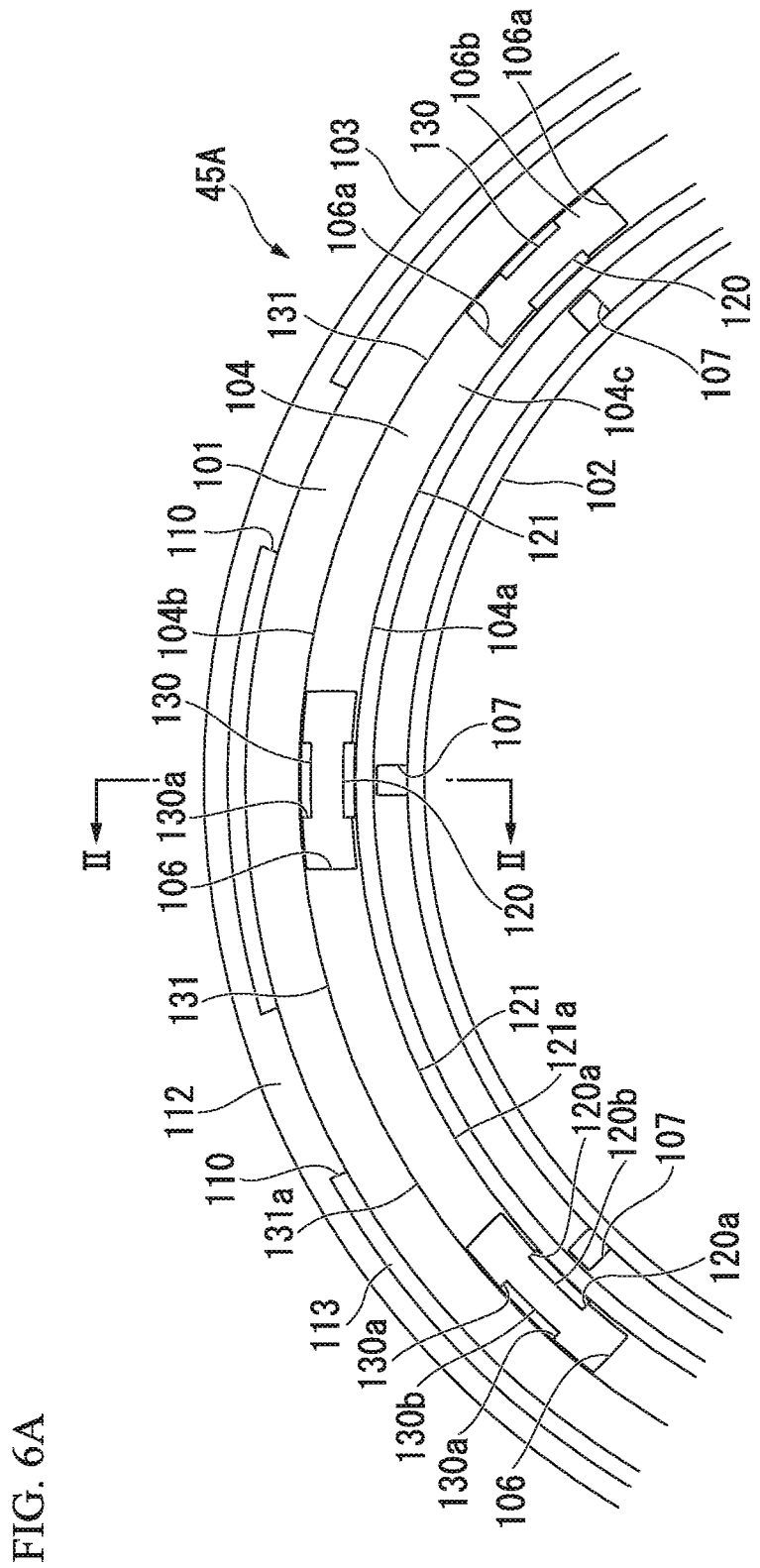
FIG. 6A is a partial front view showing a first variant of the piston seal.
Figure 6B:
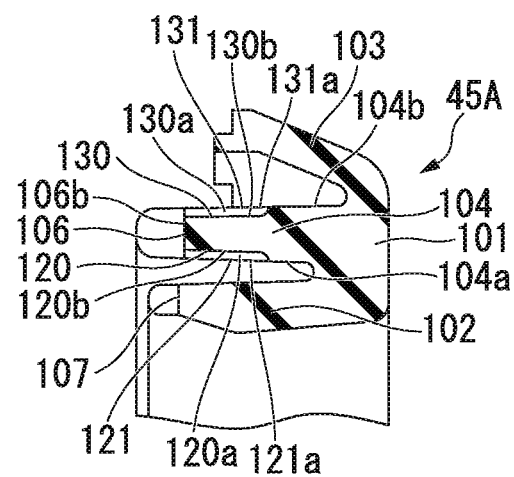
FIG. 6B is a cross-sectional view taken along line II-II of FIG. 6A showing the first variant of the piston seal.

In the piston seal 45A of the first variant, as shown in FIGS. 6A and 6B, the same inner circumferential side groove 120 as the piston seal 45 is formed. In addition, in the piston seal 45A of the first variant, an outer circumferential side groove 130 recessed inward in the seal radial direction is formed in the decreased-diameter outer circumferential surface 104b of the outer circumferential lip section 103 side of the intermediate protrusion section 104. The outer circumferential side groove 130 extends from the base section 101 side of the intermediate protrusion section 104 in the seal axial direction to be formed in a slit shape opened at the front end side of the intermediate protrusion section 104. The plurality of (in this variant, eight, which is equal to the number of inner circumferential side grooves 120) outer circumferential side grooves 130 are formed at equal intervals in the seal circumferential direction. As shown in FIG. 6A, a width in the seal circumferential direction of the outer circumferential side groove 130 is equal to a width in the seal circumferential direction of the inner circumferential side groove 120.

Central positions in the seal circumferential direction of all of the outer circumferential side grooves 130 overlap a central position in the seal circumferential direction and a position in the seal circumferential direction of the corresponding inner circumferential side grooves 120. That is, the plurality of inner circumferential side grooves 120 and the plurality of outer circumferential side grooves 130 are disposed to coincide with each other in the seal circumferential direction.

As shown in FIG. 6B, the outer circumferential side groove 130 passes through the bottom surface 106b of the intermediate groove 106 to be opened in the intermediate groove 106 like the inner circumferential side groove 120. The end portion of the base section 101 side of the outer circumferential side groove 130 is disposed closer to the intermediate groove 106 side in the seal axial direction than the base section 101, and matches the end portion of the base section 101 side of the inner circumferential side groove 120 and the position in the seal axial direction.

As shown in FIG. 6A, the outer circumferential side groove 130 has a pair of wall surfaces 130a (a wall surface 130a and a wall surface 130a), and a bottom surface 130b. The pair of the wall surfaces 130a are disposed along a radius line of the piston seal 45A in the seal axial direction and formed parallel to each other. The bottom surface 130b is formed in a flat surface, and formed parallel to the bottom surface 120b of the inner circumferential side groove 120. As shown in FIG. 6B, the end portion of the base section 101 side of the bottom surface 130b is connected to the decreased-diameter outer circumferential surface 104b through round chamfering. The piston seal 45A includes the outer circumferential side groove 130, the inner circumferential side groove 120, the intermediate groove 106, the inner lip groove 107 and the outer lip groove 110 and is formed by integral molding.

As shown in FIG. 6A, as the plurality of outer circumferential side grooves 130 are formed, a portion between the outer circumferential side groove 130 and the outer circumferential side groove 130 that are adjacent to each other in the seal circumferential direction constitutes an outer circumferential side protrusion section 131 protruding outward in the seal radial direction. The outer circumferential side protrusion section 131 extends from the base section 101 side of the intermediate protrusion section 104 to the front end side of the intermediate protrusion section 104 in the seal axial direction. The outer circumferential side protrusion sections 131 are formed to be equal in number to the outer circumferential side grooves 130 at equal intervals in the seal circumferential direction. The outer circumferential side protrusion section 131 has opposite sides in the seal circumferential direction that constitute the wall surface 130a and the wall surface 130a, and a top surface 131a that connects these wall surfaces. The top surface 131a is a portion of the decreased-diameter outer circumferential surface 104b. A length in the seal circumferential direction of the outer circumferential side protrusion section 131 is larger than that in the seal circumferential direction of the outer circumferential side groove 130. Each central position in the seal circumferential direction of all of the outer circumferential side protrusion sections 131 matches a central position in the seal circumferential direction of the corresponding inner circumferential side protrusion section 121 and a position in the seal circumferential direction. That is, the plurality of outer circumferential side protrusion sections 131 and the plurality of inner circumferential side protrusion sections 121 are disposed to coincide with each other in the seal circumferential direction.

In the piston seal 45A, even in a state in which the front end portion of the outer circumferential lip section 103 abuts the front end portion of the intermediate protrusion section 104, the outer circumferential side groove 130 of the intermediate protrusion section 104 extends closer to the base section 101 side than an abutting position of the outer circumferential lip section 103 and the intermediate protrusion section 104. For this reason, as the outer circumferential lip section 103 and the intermediate protrusion section 104 abut each other, the outer circumferential side groove 130 suppresses sealing of the space formed by these sections and the base section 101. That is, the outer circumferential side groove 130 brings the space amid the outer circumferential lip section 103, the intermediate protrusion section 104 and the base section 101 in communication with the primary pressure chamber 85 (see FIG. 2). Accordingly, occurrence of a state in which the pressure of the space amid the outer circumferential lip section 103, the intermediate protrusion section 104 and the base section 101 is less than that of the primary pressure chamber 85 can be suppressed. Accordingly, occurrence of a state in which the outer circumferential lip section 103 and the intermediate protrusion section 104 are not easily separated from each other can be suppressed. Accordingly, the piston seal 45A can be smoothly returned to the stable orientation from the deformed state, and the orientation of the piston seal 45A can be stabilized. In this case, since the outer circumferential lip section 103 is returned from the deformed state, the surface pressure of the outer circumferential lip section 103 to the groove bottom surface 88a (see FIG. 2) can be increased to secure sealability between the groove bottom surface 88a and the outer circumferential lip section 103.

In addition, since the outer circumferential side groove 130 is preferably formed in the decreased-diameter outer circumferential surface 104b of the intermediate protrusion section 104 of the piston seal 45A, the piston seal 45A can be smoothly returned to the stable orientation from the deformed state with an inexpensive structure in which there is no increase in the number of parts or complication of shapes. However, since the outer circumferential side groove 130 is formed in the intermediate protrusion section 104, a partial change of stiffness according to the position in the seal circumferential direction with respect to the outer circumferential lip section 103 can be suppressed.

Since the plurality of outer circumferential side grooves 130 are formed in the decreased-diameter outer circumferential surface 104b of the intermediate protrusion section 104 at equal intervals in the circumferential direction, the pressure of the space formed by the outer circumferential lip section 103, the intermediate protrusion section 104 and the base section 101 can immediately match the pressure of the primary pressure chamber 85. Accordingly, the piston seal 45A can be more smoothly returned from the deformed state. Further, while at least one of the outer circumferential side grooves 130 may be formed, the plurality of outer circumferential side grooves 130 may be formed to exhibit an effect of more smoothly returning the piston seal 45A from the deformed state as described above.

In addition, since the plurality of inner circumferential side grooves 120 and the plurality of outer circumferential side grooves 130 are disposed to coincide with each other in the circumferential direction, the positions of the inner circumferential side groove 120 and the outer circumferential side groove 130 in the intermediate protrusion section 104 can be easily checked visually. That is, in the intermediate protrusion section 104, cracks are easily generated because the position of the inner circumferential side groove 120 and the position of the outer circumferential side groove 130 are thinned, and upon molding or the like, these parts should be checked visually. As the inner circumferential side groove 120 and the outer circumferential side groove 130 are disposed to coincide with each other in the circumferential direction, the number of positions to check is reduced in comparison with the case in which the grooves do not coincide with each other.

[Second Variant]

Figure 7A:
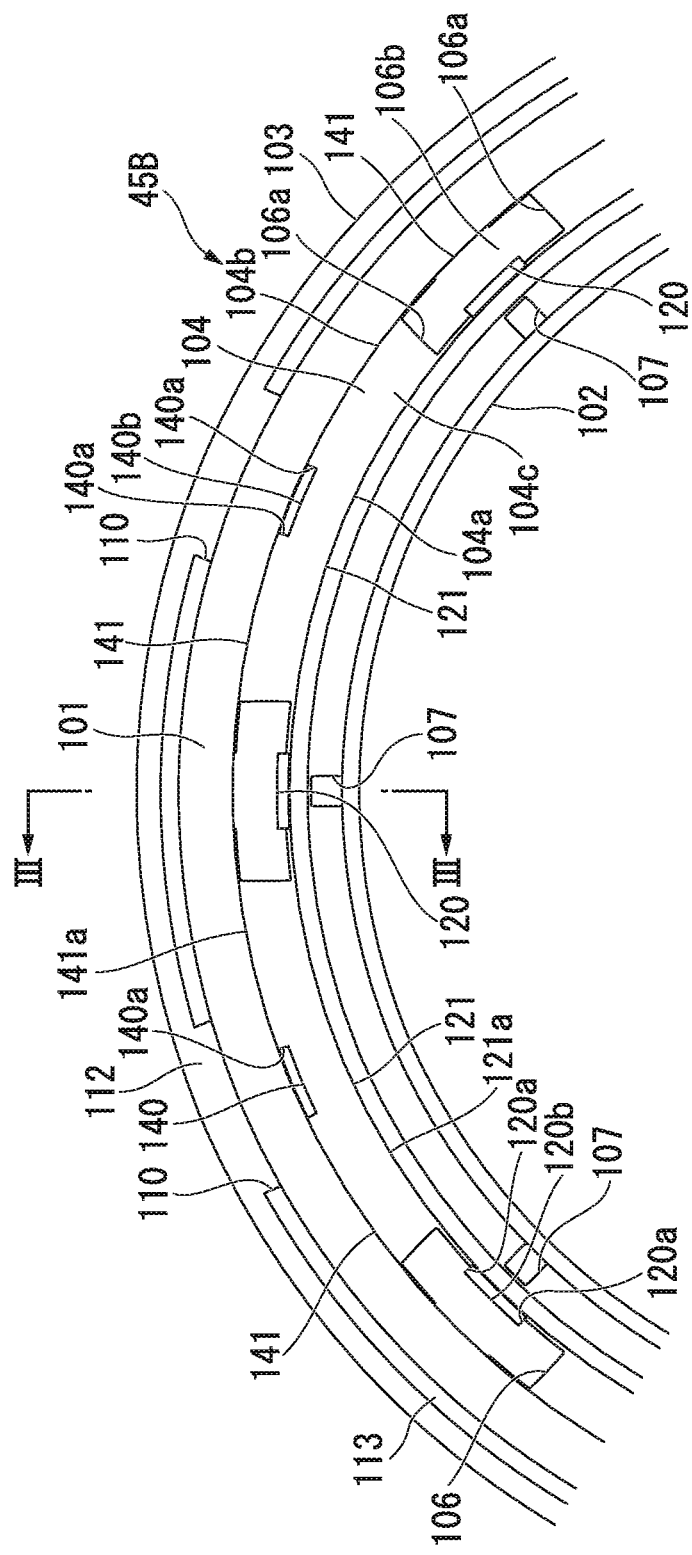
FIG. 7A is a partial front view showing a second variant of the piston seal.
Figure 7B:
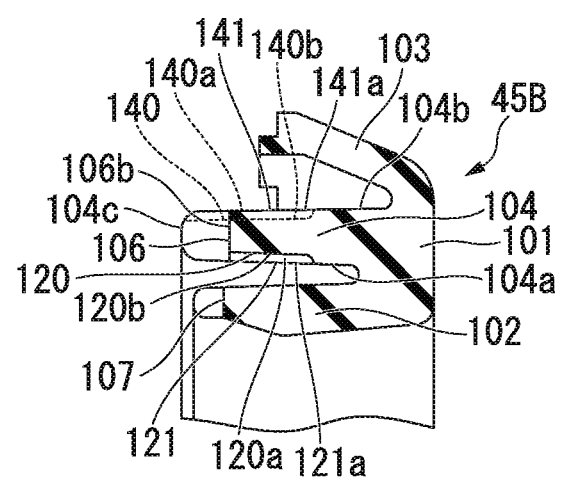
FIG. 7B is a cross-sectional view taken along line of FIG. 7A showing the second variant of the piston seal.

As shown in FIGS. 7A and 7B, the inner circumferential side groove 120 is formed in the piston seal 45B of the second variant, like in the piston seal 45A. In addition, in the piston seal 45B of the second variant, an outer circumferential side groove 140 recessed inward in the seal radial direction is formed in the decreased-diameter outer circumferential surface 104b of the outer circumferential lip section 103 side of the intermediate protrusion section 104. The outer circumferential side groove 140 extends from the base section 101 side of the intermediate protrusion section 104 in the seal axial direction to be formed in a slit shape opened at the front end side of the intermediate protrusion section 104. The plurality of (in this variant, eight, which is the same as the number of inner circumferential side grooves 120) outer circumferential side grooves 140 are formed at equal intervals in the seal circumferential direction. As shown in FIG. 7A, a width in the seal circumferential direction of the outer circumferential side groove 140 is equal to a width in the seal circumferential direction of the inner circumferential side groove 120.

Each central position in the seal circumferential direction of all of the outer circumferential side grooves 140 matches a central position between the inner circumferential side groove 120 and the inner circumferential side groove 120 that are adjacent to each other in the seal circumferential direction and a position in the seal circumferential direction. That is, the plurality of inner circumferential side grooves 120 and the plurality of outer circumferential side grooves 140 are disposed to be deviated in the seal circumferential direction. As shown by broken lines in FIG. 7B, the outer circumferential side groove 140 passes through the front end surface 104c side of the intermediate protrusion section 104 to be opened at the outside in the seal axial direction of the intermediate protrusion section 104. An end portion of the base section 101 side of the outer circumferential side groove 140 is disposed closer to the front end surface 104c side in the seal axial direction than the base section 101, and matches the end portion of the base section 101 side of the inner circumferential side groove 120 and the position in the seal axial direction.

As shown in FIG. 7A, the outer circumferential side groove 140 has a pair of wall surfaces 140a (a wall surface 140a and a wall surface 140a), and a bottom surface 140b. The pair of the wall surfaces 140a are disposed along a radius line of the piston seal 45B in the seal axial direction, and formed substantially parallel to each other. The bottom surface 140b is formed in a flat surface shape. As shown by broken lines in FIG. 7B, round chamfering is performed between the end portion of the base section 101 side of the bottom surface 140b and the decreased-diameter outer circumferential surface 104b. The piston seal 45B includes the outer circumferential side groove 140, the inner circumferential side groove 120, the intermediate groove 106, the inner lip groove 107 and the outer lip groove 110 and is formed by integral molding.

As shown in FIG. 7A, as the plurality of outer circumferential side grooves 140 are formed, a portion between the outer circumferential side groove 140 and the outer circumferential side groove 140 that are adjacent to each other in the seal circumferential direction constitutes an outer circumferential side protrusion section 141 protruding outward in the seal radial direction. The outer circumferential side protrusion section 141 extends from the base section 101 side of the intermediate protrusion section 104 to the front end side of the intermediate protrusion section 104. The outer circumferential side protrusion sections 141 are formed to be equal in number to the outer circumferential side grooves 140 at equal intervals in the seal circumferential direction. The outer circumferential side protrusion section 141 has opposite sides in the seal circumferential direction that constitute the wall surface 140a and the wall surface 140a, and a top surface 141a that connects the wall surfaces 140a. The top surface 141a is a portion of the decreased-diameter outer circumferential surface 104b. The outer circumferential side protrusion section 141 has a length in the seal circumferential direction that is larger than a length in the seal circumferential direction of the outer circumferential side groove 140.

Each central position in the seal circumferential direction of all of the inner circumferential side grooves 120 matches a central position in the seal circumferential direction of the corresponding outer circumferential side protrusion section 141 and a position in the seal circumferential direction. That is, the plurality of inner circumferential side grooves 120 and the plurality of outer circumferential side protrusion sections 141 are disposed to coincide with each other in the seal circumferential direction. In addition, each central position in the seal circumferential direction of all of the outer circumferential side grooves 140 matches a central position in the seal circumferential direction of the corresponding inner circumferential side protrusion section 121 and a position in the seal circumferential direction. That is, the plurality of outer circumferential side grooves 140 and the plurality of inner circumferential side protrusion sections 121 are disposed to coincide with each other in the seal circumferential direction. The plurality of inner circumferential side protrusion sections 121 and the plurality of outer circumferential side protrusion sections 141 are disposed to be deviated in the seal circumferential direction.

In the piston seal 45B, even in a state in which the front end portion of the outer circumferential lip section 103 abuts the front end portion of the intermediate protrusion section 104, the outer circumferential side groove 140 of the intermediate protrusion section 104 extends closer to the base section 101 side than an abutting position of the outer circumferential lip section 103 and the intermediate protrusion section 104. For this reason, sealing of a space formed amid the outer circumferential lip section 103, the intermediate protrusion section 104 and the base section 101 when the outer circumferential lip section 103 and the intermediate protrusion section 104 abut each other is suppressed by the outer circumferential side groove 140. That is, the outer circumferential side groove 140 brings the space formed by the outer circumferential lip section 103, the intermediate protrusion section 104 and the base section 101 in communication with the primary pressure chamber 85 (see FIG. 2).

The piston seal 45B of the second variant can exhibit substantially the same effect as the piston seal 45A of the first variant. In addition, because the plurality of inner circumferential side grooves 120 and the plurality of outer circumferential side grooves 140 are disposed to be deviated in the circumferential direction, a partial change of stiffness according to the position in the seal circumferential direction of the intermediate protrusion section 104 can be suppressed.

[Third Variant]

Figure 8A:
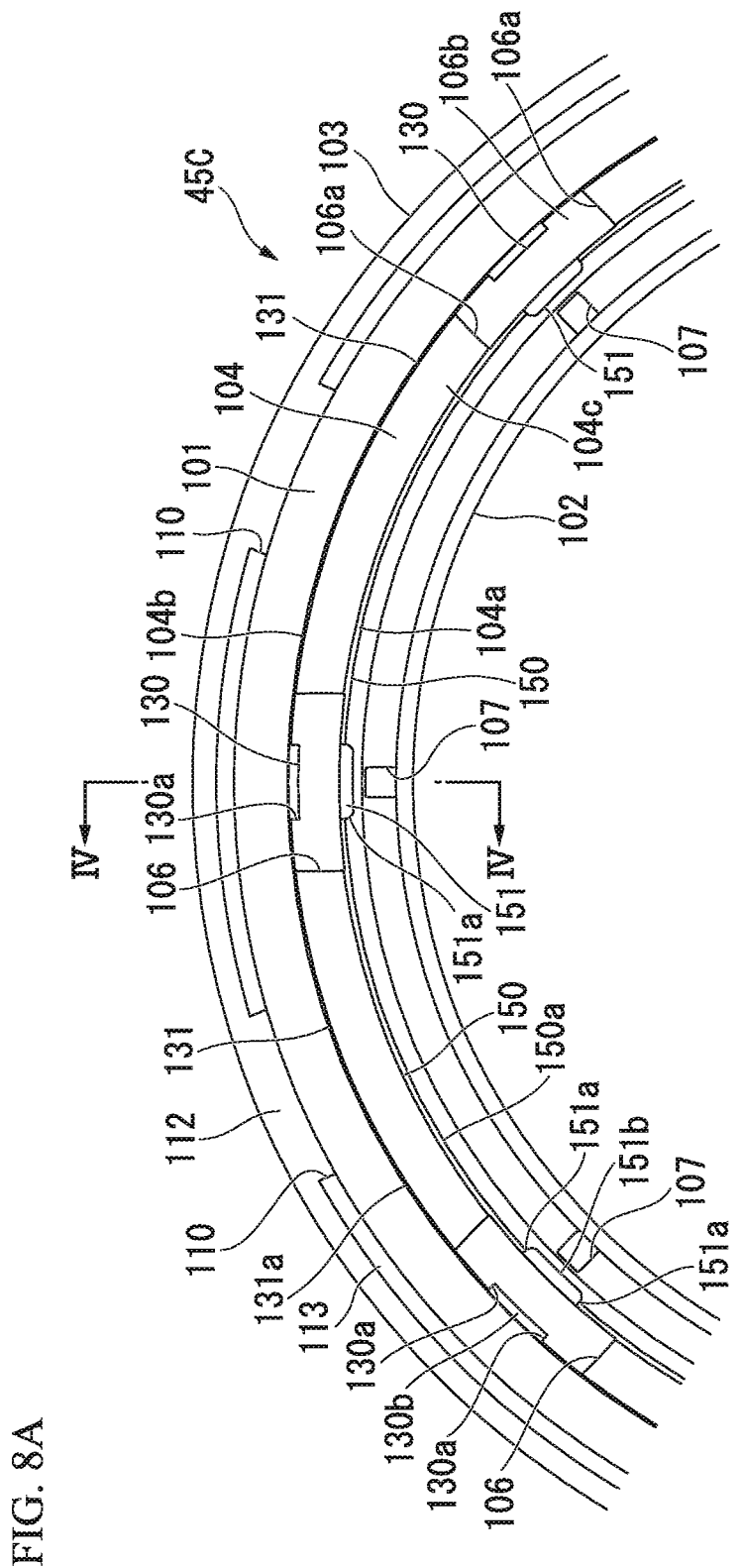
FIG. 8A is a partial front view showing a third variant of the piston seal.
Figure 8B:
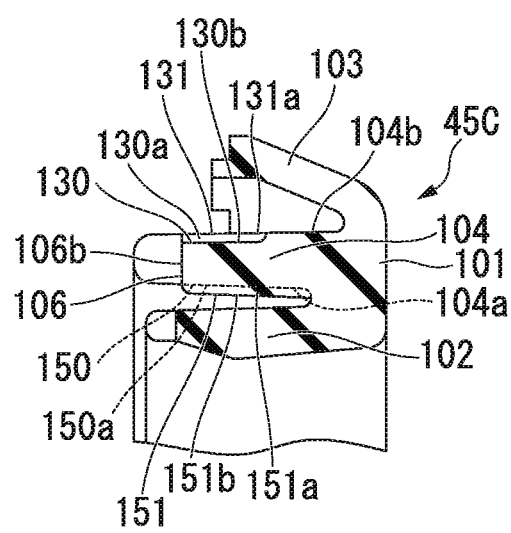
FIG. 8B is a cross-sectional view taken along line IV-IV of FIG. 8A showing the third variant of the piston seal.

As shown in FIGS. 8A and 8B, the piston seal 45C of the third variant has substantially the same outer circumferential side groove 130 as the piston seal 45A. In addition, in the piston seal 45C, an inner circumferential side protrusion section 151 protruding inward in the seal radial direction is formed in the increased-diameter inner circumferential surface 104a of the inner circumferential lip section 102 side of the intermediate protrusion section 104. As shown in FIG. 8B, the inner circumferential side protrusion section 151 extends from the base section 101 to the front end side of the intermediate protrusion section 104. The plurality of (in this variant, eight, which is the same as the number of outer circumferential side grooves 130) inner circumferential side protrusion sections 151 are formed at equal intervals in the seal circumferential direction.

As shown in FIG. 8A, each central position in the seal circumferential direction of all of the inner circumferential side protrusion sections 151 matches a central position in the seal circumferential direction of the corresponding outer circumferential side groove 130 and a position in the seal circumferential direction. That is, the plurality of inner circumferential side protrusion sections 151 and the plurality of outer circumferential side grooves 130 are disposed to coincide with each other in the seal circumferential direction. Each central position in the seal circumferential direction of all of the inner circumferential side protrusion sections 151 matches a central position in the seal circumferential direction of the corresponding intermediate groove 106 and a position in the seal circumferential direction.

The inner circumferential side protrusion section 151 has a pair of wall surfaces 151a (a wall surface 151a and a wall surface 151a) formed at both sides in the seal circumferential direction, and a top surface 151b inside in the seal radial direction. The pair of the wall surfaces 151a are disposed along a radius line of the piston seal 45C in the seal axial direction, and formed parallel to each other. The top surface 151b is formed in a flat surface shape. The width in the seal circumferential direction between the wall surface 151a and the wall surface 151a is equal to a width in the seal circumferential direction between the wall surface 130a and the wall surface 130a of the outer circumferential side groove 130. The piston seal 45C includes the outer circumferential side groove 130, the inner circumferential side protrusion section 151, the intermediate groove 106, the inner lip groove 107 and the outer lip groove 110 and is formed by integral molding.

As the plurality of inner circumferential side protrusion sections 151 are formed, a portion between the inner circumferential side protrusion section 151 and the inner circumferential side protrusion section 151 that are adjacent to each other in the seal circumferential direction constitute an inner circumferential side groove 150 recessed outward in the seal radial direction. As shown in FIG. 8B, the inner circumferential side groove 150 extends from the base section 101 to the front end side of the intermediate protrusion section 104 in the seal axial direction. As shown in FIG. 8A, the inner circumferential side grooves 150 are formed to be equal in number to the inner circumferential side protrusion sections 151 at equal intervals in the seal circumferential direction.

The inner circumferential side groove 150 has opposite sides in the seal circumferential direction that constitute the wall surface 151a and the wall surface 151a, and a bottom surface 150a that connects the wall surfaces 151a. The bottom surface 150a is a portion of the increased-diameter inner circumferential surface 104a. The inner circumferential side groove 150 has a length in the seal circumferential direction that is larger than a length in the seal circumferential direction of the inner circumferential side protrusion section 151.

Each central position in the seal circumferential direction of all of the inner circumferential side grooves 150 matches a central position in the seal circumferential direction of the corresponding outer circumferential side protrusion section 131 and a position in the seal circumferential direction. That is, the plurality of inner circumferential side grooves 150 and the plurality of outer circumferential side protrusion sections 131 are disposed to coincide with each other in the seal circumferential direction. In addition, each central position in the seal circumferential direction of all of the outer circumferential side grooves 130 matches a central position in the seal circumferential direction of the corresponding inner circumferential side protrusion section 151 and a position in the seal circumferential direction. That is, the plurality of outer circumferential side grooves 130 and the plurality of inner circumferential side protrusion sections 151 are disposed to coincide with each other in the seal circumferential direction. The plurality of outer circumferential side protrusion sections 131 and the plurality of inner circumferential side protrusion sections 151 are disposed to be deviated in the seal circumferential direction.

In the piston seal 45C, even in a state in which the front end portion of the inner circumferential lip section 102 abuts the front end portion of the intermediate protrusion section 104, the inner circumferential side groove 150 of the intermediate protrusion section 104 extends closer to the base section 101 side than an abutting position of the inner circumferential lip section 102 and the intermediate protrusion section 104. For this reason, the inner circumferential side groove 150 suppresses sealing of a space formed amid the base section 101, the inner circumferential lip section 102 and the intermediate protrusion section 104 when the inner circumferential lip section 102 and the intermediate protrusion section 104 abut each other. That is, the inner circumferential side groove 150 brings the space formed amid the inner circumferential lip section 102, the intermediate protrusion section 104 and the base section 101 in communication with the primary pressure chamber 85 (see FIG. 2 and so on).

The piston seal 45C of the third variant can exhibit substantially the same effect as the piston seal 45B of the second variant.

[Fourth Variant]

Figure 9A:
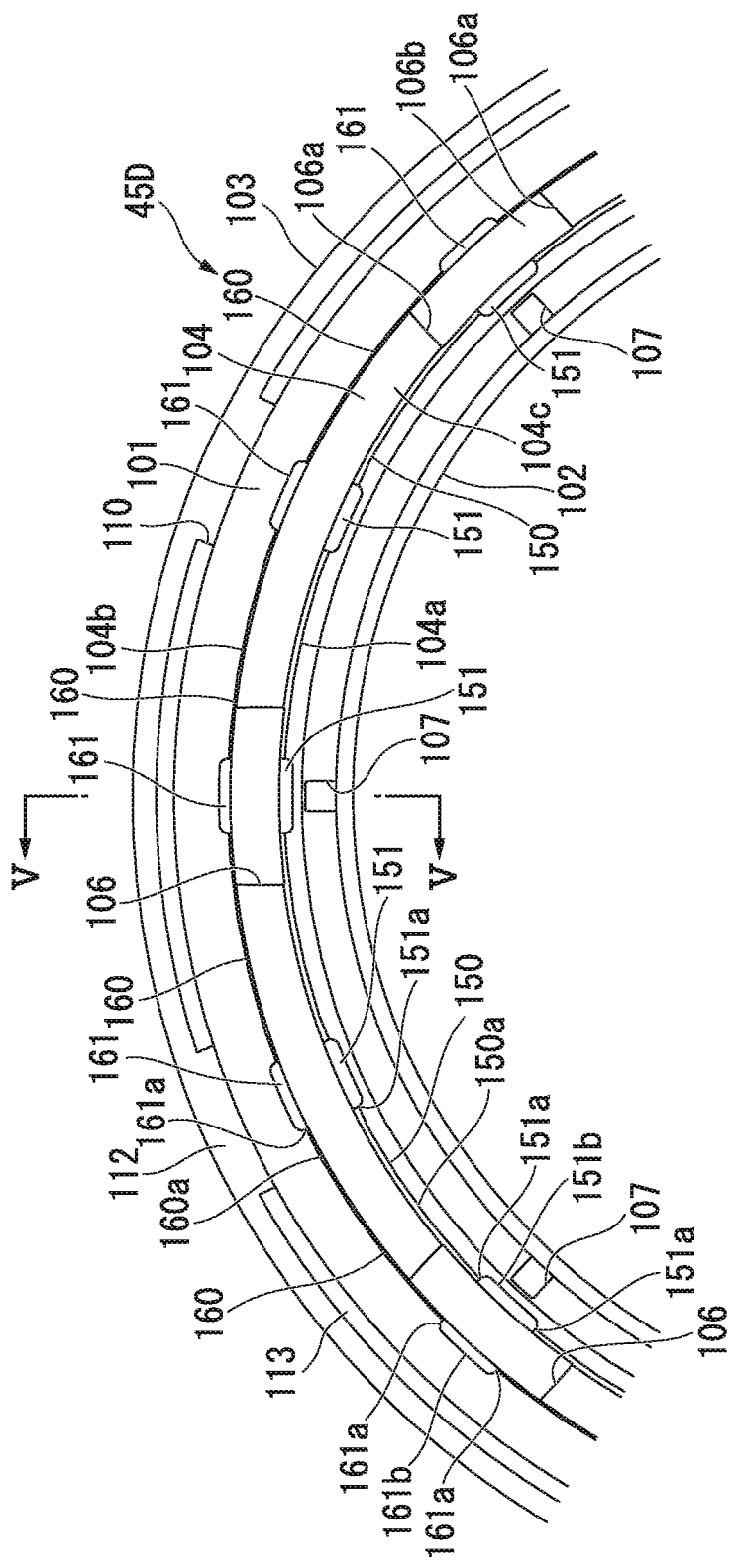
FIG. 9A is a partial front view showing a fourth variant of the piston seal.
Figure 9B:
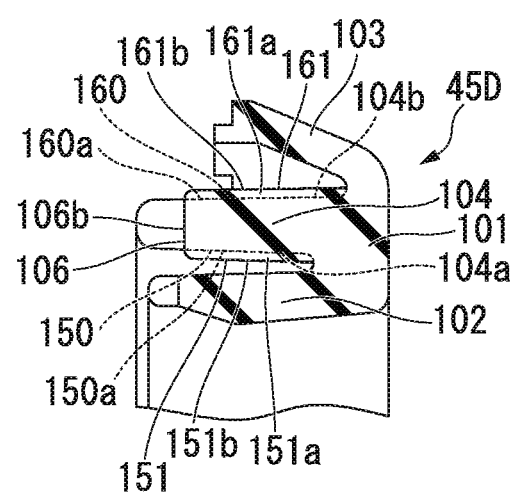
FIG. 9B is a cross-sectional view taken along line V-V of FIG. 9A showing the fourth variant of the piston seal.

As shown in FIGS. 9A and 9B, the piston seal 45D of the fourth variant has the same inner circumferential side protrusion section 151 as the third variant. In the piston seal 45D, the plurality of (in this variant, sixteen, which is twice the number in the third variant) inner circumferential side protrusion sections 151 are formed at equal intervals in the seal circumferential direction. As shown in FIG. 9A, in half of the plurality of inner circumferential side protrusion sections 151 that are disposed alternately in the seal circumferential direction, like the third variant, each central position in the seal circumferential direction matches a central position in the seal circumferential direction of the corresponding intermediate groove 106 and a position in the seal circumferential direction. In the remaining half of the plurality of inner circumferential side protrusion sections 151, each central position in the seal circumferential direction matches a central position in the seal circumferential direction between the intermediate groove 106 and the intermediate groove 106 that are adjacent to each other in the seal circumferential direction and a position in the seal circumferential direction.

Accordingly, in the piston seal 45D, the inner circumferential side grooves 150 formed between the inner circumferential side protrusion section 151 and the inner circumferential side protrusion section 151 that are adjacent to each other in the seal circumferential direction are formed to be equal in number (in this variant, sixteen, which is twice the number in the third variant) to the inner circumferential side protrusion sections 151 at equal intervals in the seal circumferential direction. Even in the piston seal 45D, the inner circumferential side groove 150 has a length in the seal circumferential direction that is larger than a length in the seal circumferential direction of the inner circumferential side protrusion section 151.

In the piston seal 45D, an outer circumferential side protrusion section 161 protruding outward in the seal radial direction is formed at the decreased-diameter outer circumferential surface 104b of the outer circumferential lip section 103 side of the intermediate protrusion section 104. As shown in FIG. 9B, the outer circumferential side protrusion section 161 extends from the base section 101 to the front end side of the intermediate protrusion section 104. The plurality of (in this variant, sixteen, which is the same as the number of inner circumferential side protrusion sections 151) outer circumferential side protrusion sections 161 are formed at equal intervals in the seal circumferential direction.

As shown in FIG. 9A, each central position in the seal circumferential direction of all of the outer circumferential side protrusion sections 161 matches a central position in the seal circumferential direction of the corresponding inner circumferential side protrusion section 151 and a position in the seal circumferential direction. That is, the plurality of inner circumferential side protrusion sections 151 and the plurality of outer circumferential side protrusion sections 161 are disposed to coincide with each other in the seal circumferential direction. In half of the plurality of outer circumferential side protrusion sections 161 that are disposed alternately in the seal circumferential direction, each central position in the seal circumferential direction matches a central position in the seal circumferential direction of the corresponding intermediate groove 106 and a position in the seal circumferential direction. In the remaining half of the plurality of outer circumferential side protrusion sections 161, each central position in the seal circumferential direction matches a central position in the seal circumferential direction of the intermediate groove 106 and the intermediate groove 106 that are adjacent to each other in the seal circumferential direction and a position in the seal circumferential direction.

The outer circumferential side protrusion section 161 has a pair of wall surfaces 161a (a wall surface 161a and a wall surface 161a) disposed at both sides in the seal circumferential direction, and a top surface 161b outside in the seal radial direction. The pair of the wall surfaces 161a are disposed along a radius line of the piston seal 45D in the seal axial direction, and formed substantially parallel to each other. The top surface 161b is formed in a flat surface shape. The width in the seal circumferential direction between the pair of the wall surfaces 161a is equal to the width in the seal circumferential direction between the wall surface 151a and the wall surface 151a of the inner circumferential side protrusion section 151. The piston seal 45D includes the outer circumferential side protrusion section 161, the inner circumferential side protrusion section 151, the intermediate groove 106, the inner lip groove 107 and the outer lip groove 110 and is formed by integral molding.

As the plurality of outer circumferential side protrusion sections 161 are formed, a portion between the outer circumferential side protrusion section 161 and the outer circumferential side protrusion section 161 that are adjacent to each other in the seal circumferential direction constitutes an outer circumferential side groove 160 recessed inward in the seal radial direction. As shown in FIG. 9B, the outer circumferential side groove 160 extends from the base section 101 to the front end side of the intermediate protrusion section 104 in the seal axial direction. As shown in FIG. 9A, the outer circumferential side grooves 160 are formed to be equal in number to the outer circumferential side protrusion sections 161 at equal intervals in the seal circumferential direction.

The outer circumferential side groove 160 has opposite sides in the seal circumferential direction that configure the wall surface 161a and the wall surface 161a, and a bottom surface 160a that connects the wall surfaces. The bottom surface 160a is a portion of the decreased-diameter outer circumferential surface 104b. The outer circumferential side groove 160 has a length in the seal circumferential direction that is larger than a length in the seal circumferential direction of the outer circumferential side protrusion section 161.

Each central position in the seal circumferential direction of all of the outer circumferential side grooves 160 matches a central position in the seal circumferential direction of the corresponding inner circumferential side groove 150 and a position in the seal circumferential direction. That is, the plurality of inner circumferential side grooves 150 and the plurality of outer circumferential side grooves 160 are disposed to coincide with each other in the seal circumferential direction.

In the piston seal 45D, even in a state in which the front end portion of the outer circumferential lip section 103 abuts the front end portion of the intermediate protrusion section 104, the outer circumferential side groove 160 of the intermediate protrusion section 104 extends closer to the base section 101 side than an abutting position of the outer circumferential lip section 103 and the intermediate protrusion section 104. For this reason, the outer circumferential side groove 160 suppresses closing of a space formed by the base section 101, the outer circumferential lip section 103 and the intermediate protrusion section 104 when the outer circumferential lip section 103 and the intermediate protrusion section 104 abut each other. That is, the outer circumferential side groove 160 brings the space formed by the outer circumferential lip section 103, the intermediate protrusion section 104 and the base section 101 in communication with the primary pressure chamber 85 (see FIG. 2 and so on).

The piston seal 45D of the fourth variant can exhibit substantially the same effect as the piston seal 45A of the first variant.

The master cylinder according to the above-mentioned embodiment has a cylinder main body formed in a bottomed cylindrical shape and having a supply path configured to come in communication with a discharge path and a reservoir of brake liquid; a piston movably disposed in the cylinder main body and configured to form a pressure chamber between the cylinder main body and the piston to supply liquid pressure into the discharge path; and a piston seal provided in a circumferential groove formed in the cylinder main body and configured to allow an inner circumference to come in sliding contact with the piston to seal between the supply path and the pressure chamber, wherein the piston seal includes an annular base section; an inner circumferential lip section protruding from an inner circumferential side of the base section to come into sliding contact with an outer circumferential surface of the piston; an outer circumferential lip section protruding from an outer circumferential side of the base section to abut the circumferential groove of the cylinder main body; and an intermediate protrusion section protruding from a portion between the inner circumferential lip section and the outer circumferential lip section of the base section to a position further forward than the outer circumferential lip section. At least one inner circumferential side groove extending in an axial direction and opened at a front end side of the intermediate protrusion section is formed in a surface of the inner circumferential lip section side of the intermediate protrusion section. Accordingly, even in a state in which the front end portion of the inner circumferential lip section abuts the front end portion of the intermediate protrusion section, the inner circumferential side groove of the intermediate protrusion section suppresses sealing of the space amid the inner circumferential lip section, the intermediate protrusion section and the base section. Accordingly, a state in which the inner circumferential lip section and the intermediate protrusion section are not easily separated from each other can be suppressed, and as a result, the piston seal can be smoothly returned to the stable orientation from the deformed state and the orientation of the piston seal can be stabilized. In addition, since the inner circumferential side groove is preferably formed in the surface of the inner circumferential lip section side of the intermediate protrusion section of the piston seal, the piston seal can be smoothly returned to the stable orientation from the deformed state with an inexpensive structure in which there is no increase in the number of parts or complication of shapes. However, since the inner circumferential side groove is formed in the intermediate protrusion section, a partial change of stiffness according to the position in the seal circumferential direction with respect to the inner circumferential lip section can be suppressed.

In addition, the plurality of inner circumferential side grooves are formed in the surface of the inner circumferential lip section side of the intermediate protrusion section in a circumferential direction. Accordingly, the piston seal can be more smoothly returned from the deformed state.

In addition, at least one outer circumferential side groove extending in the axial direction and opened at the front end side of the intermediate protrusion section is formed in a surface of the outer circumferential lip section side of the intermediate protrusion section. Accordingly, even in a state in which the front end portion of the outer circumferential lip section abuts the front end portion of the intermediate protrusion section, the outer circumferential side groove of the intermediate protrusion section suppresses sealing of the space surrounded by the outer circumferential lip section, the intermediate protrusion section and the base section. Accordingly, the state in which the outer circumferential lip section and the intermediate protrusion section are not easily separated from each other can be suppressed. As a result, the piston seal can be smoothly returned to the stable orientation from the deformed state, and the orientation of the piston seal can be stabilized. In addition, since the outer circumferential side groove is preferably formed in the surface of the outer circumferential lip section side of the intermediate protrusion section of the piston seal, the piston seal can be smoothly returned to the stable orientation from the deformed state with an inexpensive structure in which there is no increase in the number of parts or complication of shapes. However, since the outer circumferential side groove is formed in the intermediate protrusion section, a partial change of stiffness according to the position in the seal circumferential direction with respect to the outer circumferential lip section can be suppressed.

In addition, the plurality of outer circumferential side grooves are formed in a surface of the outer circumferential lip section side of the intermediate protrusion section in the circumferential direction. Accordingly, the piston seal can be more smoothly returned from the deformed state.

In addition, the plurality of inner circumferential side grooves and the plurality of outer circumferential side grooves are disposed to coincide with each other in the circumferential direction. Accordingly, positions of the inner circumferential side groove and the outer circumferential side groove of the intermediate protrusion section can be easily checked visually.

In addition, the plurality of inner circumferential side grooves and the plurality of outer circumferential side grooves are disposed to be deviated in the circumferential direction. Accordingly, a partial change of stiffness according to the position in the circumferential direction of the intermediate protrusion section can be suppressed.

Protrusion sections extending to the front end side of the intermediate protrusion section and protruding inward are formed amid the plurality of inner circumferential side grooves, and the protrusion sections are disposed to coincide with the plurality of outer circumferential side grooves in the circumferential direction. Accordingly, a partial change of stiffness according to the position in the circumferential direction of the intermediate protrusion section can be suppressed.

INDUSTRIAL APPLICABILITY

According to the above-mentioned master cylinder, the orientation of the piston seal can be stabilized.

REFERENCE SIGNS LIST 11 master cylinder
12 reservoir
13 bottom section
15 cylinder main body
16 opening section
18 primary piston (piston)
18a outer circumferential surface
19 secondary piston (piston)
26 secondary discharge path (discharge path)
27 primary discharge path (discharge path)
30, 32 circumferential groove
35, 45, 45A to 45D piston seal
38 secondary supply path (supply path)
48 primary supply path (supply path)
68 secondary pressure chamber (pressure chamber)
85 primary pressure chamber (pressure chamber)
101 base section
102 inner circumferential lip section
103 outer circumferential lip section
104 intermediate protrusion section
104a increased-diameter inner circumferential surface (surface of inner circumferential lip section side of intermediate protrusion section)
104b decreased-diameter outer circumferential surface (surface of outer circumferential lip section side of intermediate protrusion section)
120, 150 inner circumferential side groove
121, 151 inner circumferential side protrusion section
130, 140, 160 outer circumferential side groove
131, 141, 161 outer circumferential side protrusion section

The invention claimed is:

1. A master cylinder comprising:
a cylinder main body formed in a bottomed cylindrical shape and having a discharge path of brake liquid and a supply path configured to come in communication with a reservoir of brake liquid;
a piston movably disposed in the cylinder main body and configured to form a pressure chamber between the cylinder main body and the piston to supply liquid pressure into the discharge path; and
a piston seal provided in a circumferential groove formed in the cylinder main body and configured to allow an inner circumference to come into sliding contact with the piston to seal between the supply path and the pressure chamber,
wherein the piston seal includes:
an annular base section;
an inner circumferential lip section protruding from an inner circumferential side of the base section to come into sliding contact with an outer circumferential surface of the piston;
an outer circumferential lip section protruding from an outer circumferential side of the base section to abut the circumferential groove of the cylinder main body; and
an intermediate protrusion section protruding from a portion between the inner circumferential lip section and the outer circumferential lip section of the base section to a position further forward than the outer circumferential lip section,
wherein a plurality of inner circumferential side grooves extending in an axial direction and opened at a front end side of the intermediate protrusion section are formed in a surface of the inner circumferential lip section side of the intermediate protrusion section in a circumferential direction, and
wherein the plurality of inner circumferential side grooves are arranged such that respective intervals between adjacent inner circumferential side grooves are set to a same distance and where each of the inner circumferential side grooves is spaced equally by the intervals in the circumferential direction.

2. The master cylinder according to claim 1, wherein a plurality of outer circumferential side grooves extending in the axial direction and opened at the front end side of the intermediate protrusion section are formed in a surface of the outer circumferential lip section side of the intermediate protrusion section.

3. The master cylinder according to claim 2, wherein the plurality of outer circumferential side grooves are formed in the surface of the outer circumferential lip section side of the intermediate protrusion section in the circumferential direction, and
wherein the plurality of outer circumferential side grooves are arranged such that respective intervals between adjacent outer circumferential side grooves are set to a same distance and where each of the outer circumferential side grooves is spaced equally by the intervals in the circumferential direction.

4. The master cylinder according to claim 3, wherein the plurality of inner circumferential side grooves and the plurality of outer circumferential side grooves are disposed to coincide with each other in the circumferential direction.

5. The master cylinder according to claim 3, wherein the plurality of inner circumferential side grooves and the plurality of outer circumferential side grooves are disposed to be deviated in the circumferential direction.

6. The master cylinder according to claim 3, wherein a plurality of protrusion sections extending to the front end side of the intermediate protrusion section and protruding inward are formed amid the plurality of inner circumferential side grooves, and
the protrusion sections are disposed to coincide with the plurality of outer circumferential side grooves in the circumferential direction.

7. The master cylinder according to claim 1,
wherein at least one intermediate groove is provided at a front end side of the intermediate protrusion section, and
wherein the inner circumferential side grooves have a width in the circumferential direction that is smaller than a width in the circumferential direction of the intermediate groove.

8. The master cylinder according to claim 2,
wherein at least one intermediate groove is provided at a front end side of the intermediate protrusion section, and
wherein the outer circumferential side grooves have a width in the circumferential direction that is equal to a width in the circumferential direction of the intermediate groove.

* * * * *